(12) United States Patent
Ryan et al.

(10) Patent No.: US 10,335,758 B2
(45) Date of Patent: Jul. 2, 2019

(54) MICROCAPSULES HAVING DUAL REAGENTS FOR FORMING A SELF-HEALING MATERIAL SEPARATED BY THE CAPSULE WALL AND METHODS FOR MAKING SAME

(71) Applicant: Microtek Laboratories, Inc., Dayton, OH (US)

(72) Inventors: Kayla L. M. Ryan, Alamogordo, NM (US); Carl M. Lentz, Waynesville, OH (US)

(73) Assignee: Microtek Laboratories, INC., Dayton, OH (US)

( * ) Notice: Subject to any disclaimer, the term of this patent is extended or adjusted under 35 U.S.C. 154(b) by 0 days.

(21) Appl. No.: 16/168,962

(22) Filed: Oct. 24, 2018

(65) Prior Publication Data

US 2019/0054441 A1    Feb. 21, 2019

Related U.S. Application Data

(63) Continuation-in-part of application No. 15/646,478, filed on Jul. 11, 2017.

(60) Provisional application No. 62/576,337, filed on Oct. 24, 2017, provisional application No. 62/360,672, filed on Jul. 11, 2016, provisional application No. 62/419,325, filed on Nov. 8, 2016.

(51) Int. Cl.
| | | |
|---|---|---|
| C09F 9/00 | (2006.01) | |
| B01J 13/08 | (2006.01) | |
| B01J 13/22 | (2006.01) | |
| C09D 5/00 | (2006.01) | |
| B01J 13/02 | (2006.01) | |
| B29C 73/22 | (2006.01) | |
| B29C 73/16 | (2006.01) | |
| B29K 61/04 | (2006.01) | |

(52) U.S. Cl.
CPC ............. *B01J 13/22* (2013.01); *B01J 13/025* (2013.01); *B29C 73/163* (2013.01); *B29C 73/22* (2013.01); *B29K 2061/04* (2013.01)

(58) Field of Classification Search
None
See application file for complete search history.

*Primary Examiner* — Jeffrey D Washville
(74) *Attorney, Agent, or Firm* — FisherBroyles, LLP; Susan M. Oiler

(57) ABSTRACT

Rupturable, dual reagent mono-capsules are disclosed that have a core composition, which includes a carboxylic acid, encapsulated within a phenolic resin-containing polymer wall that ruptures upon exposure to alkaline conditions over a period of time, and a shell connected to an exterior surface of the polymer wall by a surfactant. The shell is made from a mineral containing a metal that is chemically bonded to the surfactant by a chemical electrostatic interaction. Upon rupture of the polymer wall of the mono-capsule, the carboxylic acid and the mineral containing the metal chemically react with one another to form a reaction product that seals a rupture in the capsule and/or seals a feature of a surface upon which the capsules are disposed.

18 Claims, 36 Drawing Sheets

(21 of 36 Drawing Sheet(s) Filed in Color)

FIG. 4   10x magnification

FIG. 5     60x magnification 40x, 4 hrs after breaking capsules

T = 24 hrs (crystals start to form after 4-5 hours)

US 10,335,758 B2

MICROCAPSULES HAVING DUAL REAGENTS FOR FORMING A SELF-HEALING MATERIAL SEPARATED BY THE CAPSULE WALL AND METHODS FOR MAKING SAME

RELATED APPLICATIONS

This application claims the benefit of U.S. Provisional Application No. 62/576,337, filed Oct. 24, 2017, which is incorporated herein by reference. This application is a continuation-in-part of U.S. application Ser. No. 15/646,478, filed Jul. 11, 2017, which claims the benefit of U.S. Provisional Application No. 62/360,672, filed Jul. 11, 2016, which is incorporated herein by reference, and the benefit of U.S. Provisional Application No. 62/419,325, filed Nov. 8, 2016, which is incorporated herein by reference.

TECHNICAL FIELD

The present application relates to a dual reagent microcapsule with a first reagent in the core composition and a second reagent tethered to the polymer wall of the microcapsule, where the first reagent and second reagent chemically react together to form a reaction product once the microcapsule ruptures upon exposure to alkaline conditions or mechanical rupture.

BACKGROUND

Microcapsules can be constructed of various types of wall or shell materials to house varying core material for many purposes. The encapsulation process is commonly referred to as microencapsulation. Microencapsulation is the process of surrounding or enveloping one substance, often referred to as the core material, within another substance, often referred to as the wall, shell, or capsule, on a very small scale. The scale for microcapsules may be particles with diameters in the range between 1 μm and 1000 μm that consist of a core material and a covering shell. The microcapsules may be spherically shaped, with a continuous wall surrounding the core, while others may be asymmetrical and variably shaped.

General encapsulation processes include emulsion polymerization, bulk polymerization, solution polymerization, and/or suspension polymerization and typically include a catalyst. Emulsion polymerization occurs in a water/oil or oil/water mixed phase. Bulk polymerization is carried out in the absence of solvent. Solution polymerization is carried out in a solvent in which both the monomer and subsequent polymer are soluble. Suspension polymerization is carried out in the presence of a solvent (usually water) in which the monomer is insoluble and in which it is suspended by agitation. To prevent the droplets of monomers from coalescing and to prevent the polymer from coagulating, protective colloids are typically added.

Through a selection of the core and shell material, it is possible to obtain microcapsules with a variety of functions. This is why microcapsules can be defined as containers, which can release, protect and/or mask various kinds of active core materials. Microencapsulation is mainly used for the separation of the core material from the environment, but it can also be used for controlled release of core material in the environment. Microcapsule walls can also act as a barrier, separating a two-component system, where one constituent is in the core and the other is in the environment surrounding the capsule, such as being within a matrix in which the capsules are located. A disadvantage to a capsule/matrix system is that they are typically not cost effective because the matrix requires more material of the second reagent or catalyst to be present than is actually necessary for a typical reaction to occur. Furthermore, an even dispersion of the capsules in the matrix (or medium) is required, and is not easily achieved when considering the differences in density of the materials and/or the size of the capsule. Furthermore, often times a specific stoichiometry of reagents is required, and having one reagent as the matrix would limit the number of reactions that can be carried out.

Another way to separate two components is by synthesizing two different capsules, one with a first reagent in it and the other with a second reagent in it. When the capsules are ruptured by damage, the intended effect is triggered through the release and reaction of the reagents. After release, the reagent is depleted, leading to a singular local event. The main issue with having two separate capsules is that both capsules would need to be ruptured simultaneously within a reasonable distance from one another in order for a reaction to occur. Furthermore, an even dispersion of the two capsules is required, which is not easily achieved when considering the differences in the density of materials and/or the size of the two capsules.

Two component chemically reactive systems for self-healing applications have been explored for use in materials used to make bridges, buildings, and underground popes as just a few examples. The purpose of self-healing materials is for repairs to be made for smaller cracks and/or corrosion in these types of materials without having to manually replace part or all of the original material.

Since the development of microcapsules, there has been a constant need for improved microcapsules. Further, self-healing formulations have been researched for at least the past decade in an attempt to restore the physical and mechanical integrity of a surface quickly after damage occurs without human intervention. In particular, there is a need to develop a two-component microcapsule system that separates two reagents in a more compact unit, in close proximity until the time is needed for their interaction, especially ones that can provide a self-healing formulation.

SUMMARY

Here, the above disadvantages are overcome by encapsulating a carboxylic acid inside a polymer wall in the form of a microcapsule, which is further encapsulated in an alumoxane material, which may be in the form of a crystalline discontinuous shell. The alumoxane is tethered to the polymer wall of the microcapsules using a surfactant. Upon rupture of the polymer wall after exposition to an alkaline condition, such as a corrosion event, or a mechanical rupturing condition, the carboxylic acid core contacts the alumoxane material, thereby chemically reacting to form a carboxylate-alumoxane. The selection of the carboxylic acid affects the crystalline structure of the carboxylate-alumoxane and hence the properties thereof.

In all aspects, dual reagent mono-microcapsules are disclosed that are rupturable under alkaline conditions. The mono-microcapsules have a carboxylic acid in the core composition of the capsule and a mineral containing a metal is tethered to the exterior surface of a phenolic resin-containing polymer wall of the microcapsules by a surfactant. The carboxylic acid is a carboxylic acid functionalized graphene oxide, a monocarboxylic acid, a dicarboxylic acid, a tricarboxylic acid, or combinations thereof. The microcapsules carry the "second reagent," the mineral containing the metal, with them for equal distribution of the carboxylic acid and the second reagents throughout a carrier, such as a paint, coating, or the like. Upon rupture of the microcapsules, the carboxylic acid and the second reagent will react with one another and form a reaction product. In one embodiment, the reaction product is a material suitable for self-healing a surface upon which the microcapsules are present, but has other applications as well.

The phenolic resin-containing polymer wall is made of a resorcinol urea formaldehyde or resorcinol urea glutaraldehyde polymer. The phenolic resin-containing polymer wall experiences a colorimetric change upon exposure to the alkaline conditions as well as a rupture of the polymer wall after a sufficient period of time for the respective alkaline pH.

The mineral is an inorganic compound and the shell connected to the exterior surface of the polymer wall by the surfactant is crystalline. The metal within the mineral may be aluminum calcium, silver, magnesium, iron, copper, and cobalt, and combinations thereof. In one embodiment, the mineral is nano-boehmite, which includes aluminum as the metal.

In another aspect, methods for surface treating capsules to form an outer shell about the polymer wall of preformed capsules is disclosed. The methods include providing capsules comprising a core composition that includes a carboxylic acid encapsulated within a phenolic resin-containing polymer wall, mixing an aqueous surfactant and the capsules together under conditions that enables surfactant attachment to an exterior surface of the polymer wall to form a surfactant-capsule intermediate, and then adding a solution of an inorganic compound where a metal therein is available for association with the surfactant. The inorganic compound is added with mixing until the metal of the inorganic compound chemically bonds to the surfactant and forms an outer shell on the polymer wall of the capsules. The method may also include a step of first forming the capsules before mixing with the aqueous surfactant. The phenolic resin-containing polymer wall ruptures upon exposure to alkaline conditions over a period of time, and, upon rupture of the capsules, the carboxylic acid and the outer shell chemically react with one another to form a reaction product that seals a rupture in the capsule or seals a feature of a surface upon which the capsules are disposed.

In another aspect, self-healing materials are disclosed that have a plurality of the rupturable capsules disclosed herein in a delivery medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description will illustrate the general principles of the invention, examples of which are additionally illustrated in the accompanying drawings.

As used herein, the term "about" allows a degree of variability in a value or range, for example, within 10% of a stated value or of a stated limit of a range for all embodiments, but within 5% of a stated value or of a stated limit of a range in more preferred embodiments.

Figure 1:
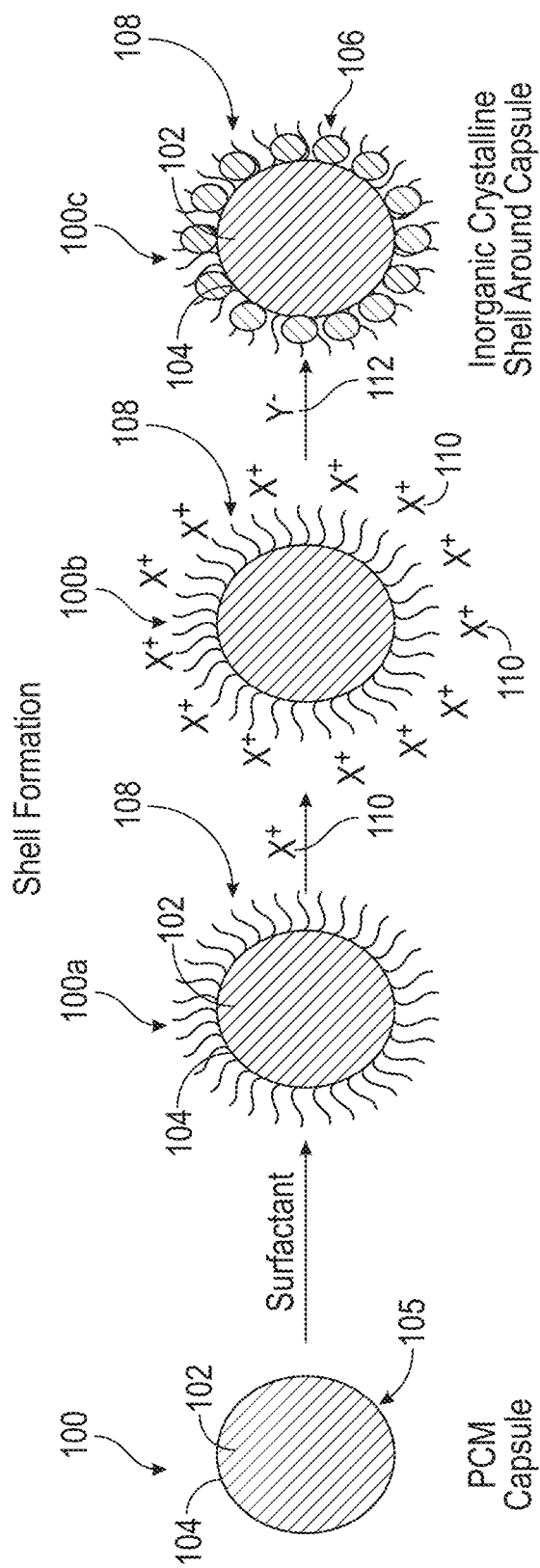
FIG. 1 is a flow diagram of a first embodiment of shell formation on microcapsules, represented as a cross-sectional view.
Figure 2:
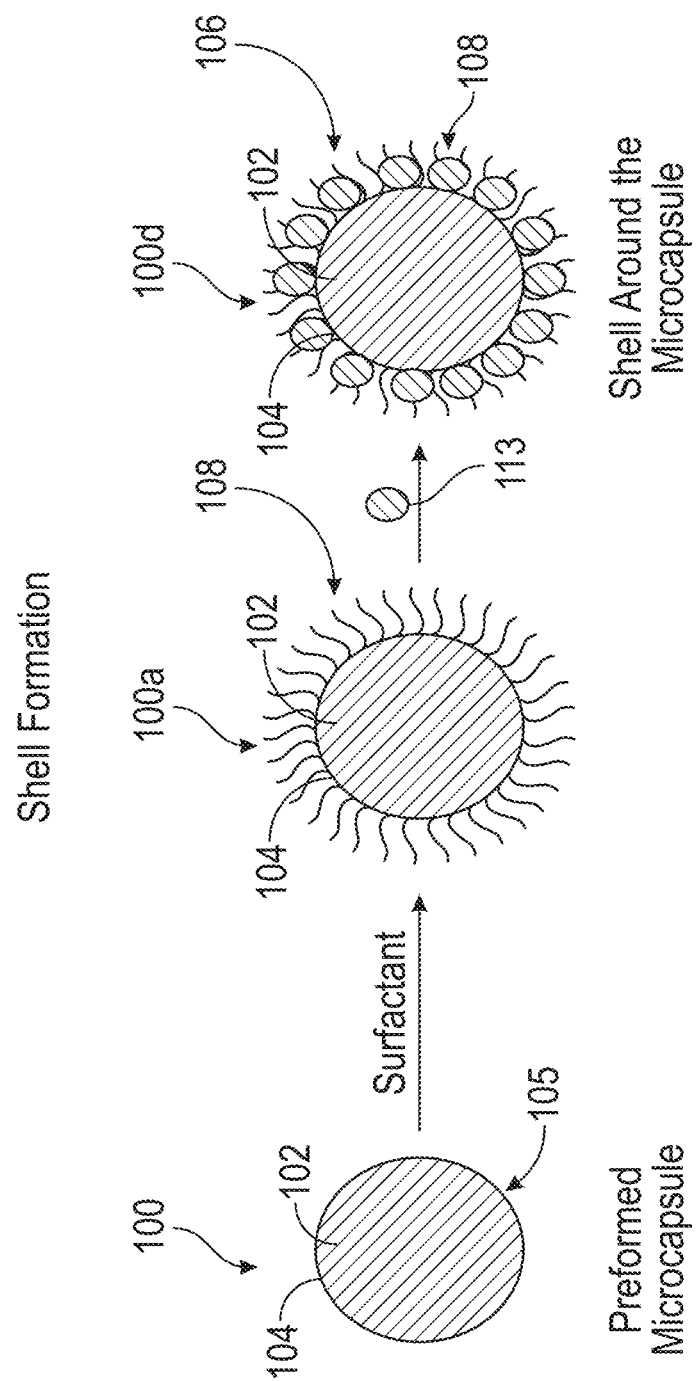
FIG. 2 is flow diagram of a second embodiment of shell formation on microcapsules, represented as a cross-sectional view.
Figure 3:
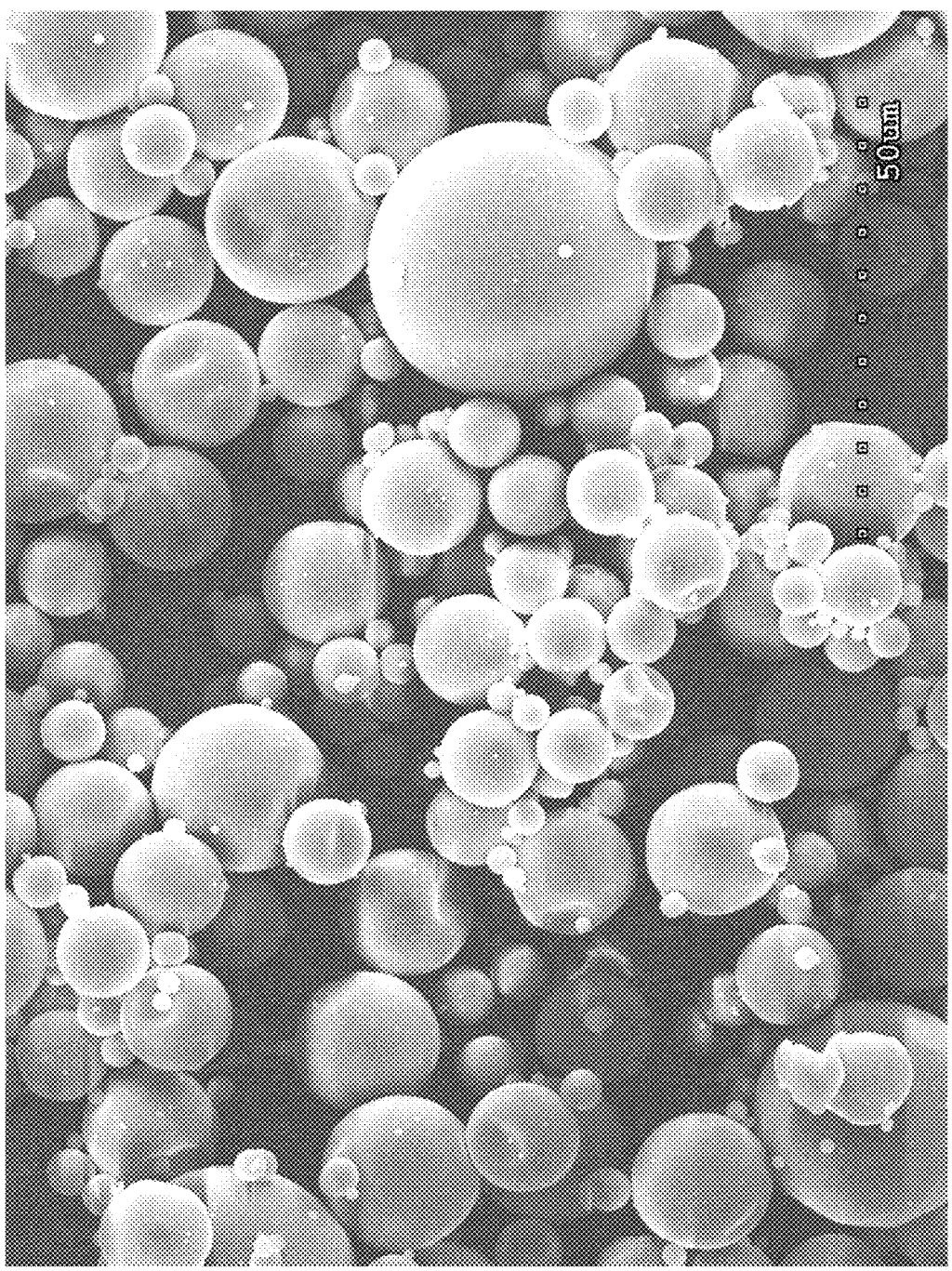
FIG. 3 is an SEM image, 50 μm scale, of microcapsules having a core encapsulated by a polymer wall prior to the addition of an exterior shell.

Referring to FIGS. 1 and 2, capsules 100c and 100d each have an outer shell 106, an inorganic shell, surrounding a polymer wall 104 encapsulating a core composition 102. The shell 106 is typically an outermost shell, but in some embodiments the shell 106 may have an exterior coating applied thereto after formation. The capsules 100c and 100d begin as pre-formed capsules 100 that have a core composition 102 encapsulated within a polymer wall 104. An SEM image of one embodiment of pre-formed capsules is included as FIG. 3. It is noted that the capsules are generally spherical capsules and based on their size are referred to as microcapsules.

With reference to FIG. 1, the shell 106 is connected to an exterior surface 105 of the polymer wall 104 of the pre-formed capsule 100 by a surfactant 108, and has a cation 110 attracted to the surfactant 108 and an anion or an anion equivalent 112 chemically bonded to the cation to form a solid precipitate (i.e., the shell 106). The solid precipitate is discontinuous on the exterior surface of the capsule and, after deposition, is held there by the surfactant.

Figure 6:
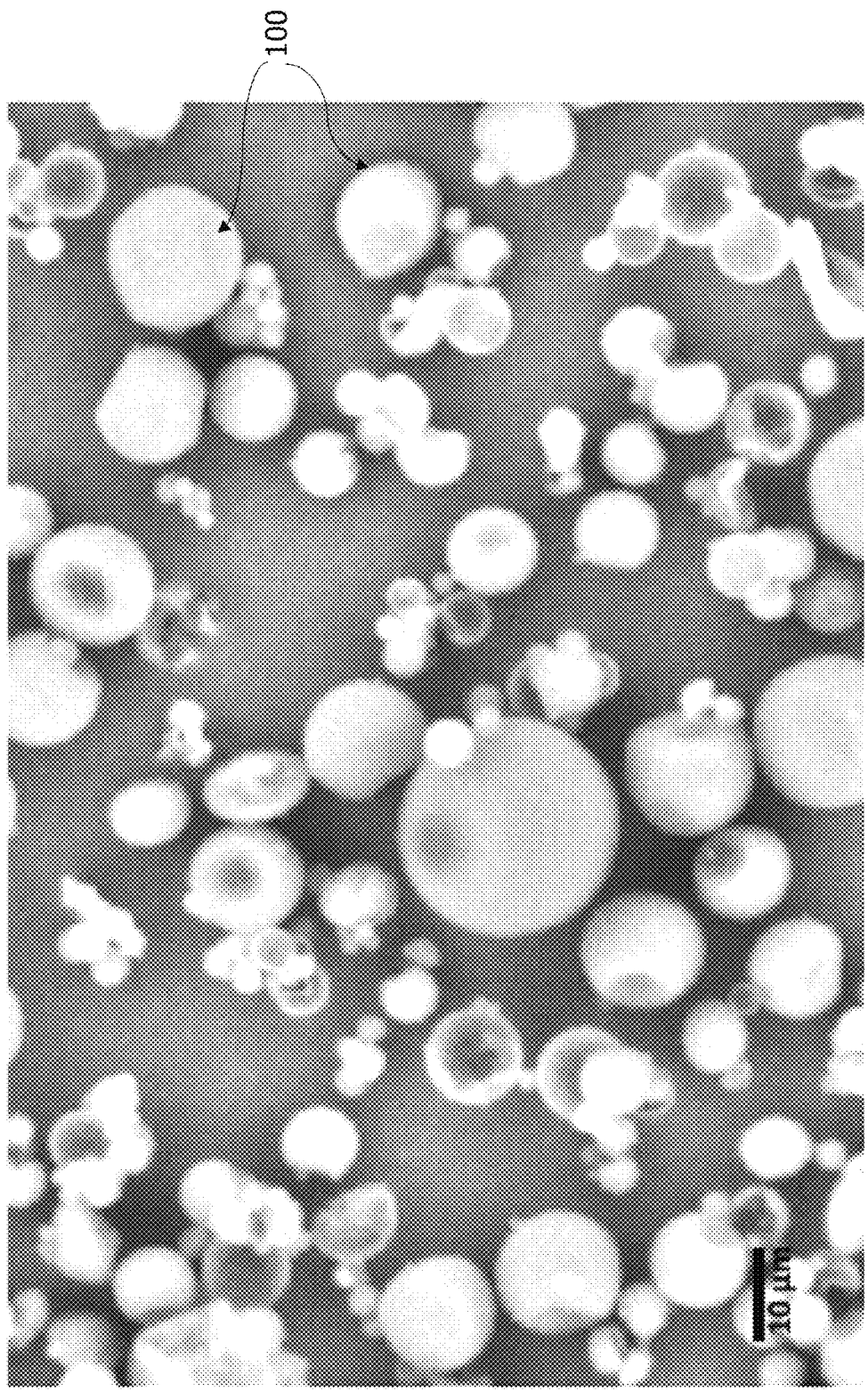
FIG. 6 is an SEM image, 10 μm scale, of a plurality of boehmite coated microcapsules containing a carboxylic acid core made per the shell formation process of FIG. 1.

With reference to FIG. 2, in an alternate process, the shell 106 is connected to an exterior surface 105 of the polymer wall 104 of the pre-formed capsule 100 by a surfactant 108, and has a metal-containing compounding 113 attracted to the surfactant 108 to form a solid shell 106. The solid shell has the same or similar characteristics to those discussed above for the first process. An example of a discontinuous, crystalline shell is shown in the images of FIG. 6. Here, the core of the final capsule 100d comprises dodecanoic acid, the polymer wall is a cross-linked melamine polymer, and the shell 106 comprises boehmite (an aluminum oxide hydroxide mineral). The shell 106 is deposited onto the capsules, held there by the surfactant.

Synthesis of the dual reagent mono-microcapsules is carried out in the following way. First, the liquid core component, usually an oil or a wax, is mixed together with water and a surfactant at a temperature above the material's melting point and stirred until a stable emulsion forms. Then, the desired size of the capsules in the emulsion is obtained with a homogenizer, and the wall materials are added sequentially. The newly formed microcapsules are then cured at 65-85° C. for 4-8 hours, then cooled to ambient temperature. Then, the pre-formed microcapsules are washed via vacuum filtration, and re-suspended in water for application of the second reagent to the outer wall. A surfactant is applied to the outer wall of the capsules, then the second reagent is tethered to the surfactant through electrostatic interactions, either through the cation-anion process of FIG. 1 or the metal compound process of FIG. 2. The dual reagent mono capsules are then washed several times and filtered.

Often times, the secondary reagent is an inorganic compound. Because inorganic compounds form crystalline structures rather than continuous films, the secondary reagent on the surface of the capsules is often seen as a rough, granular layer, which is demonstrated in FIG. 6 and described above as being generally a discontinuous shell.

Figure 4:
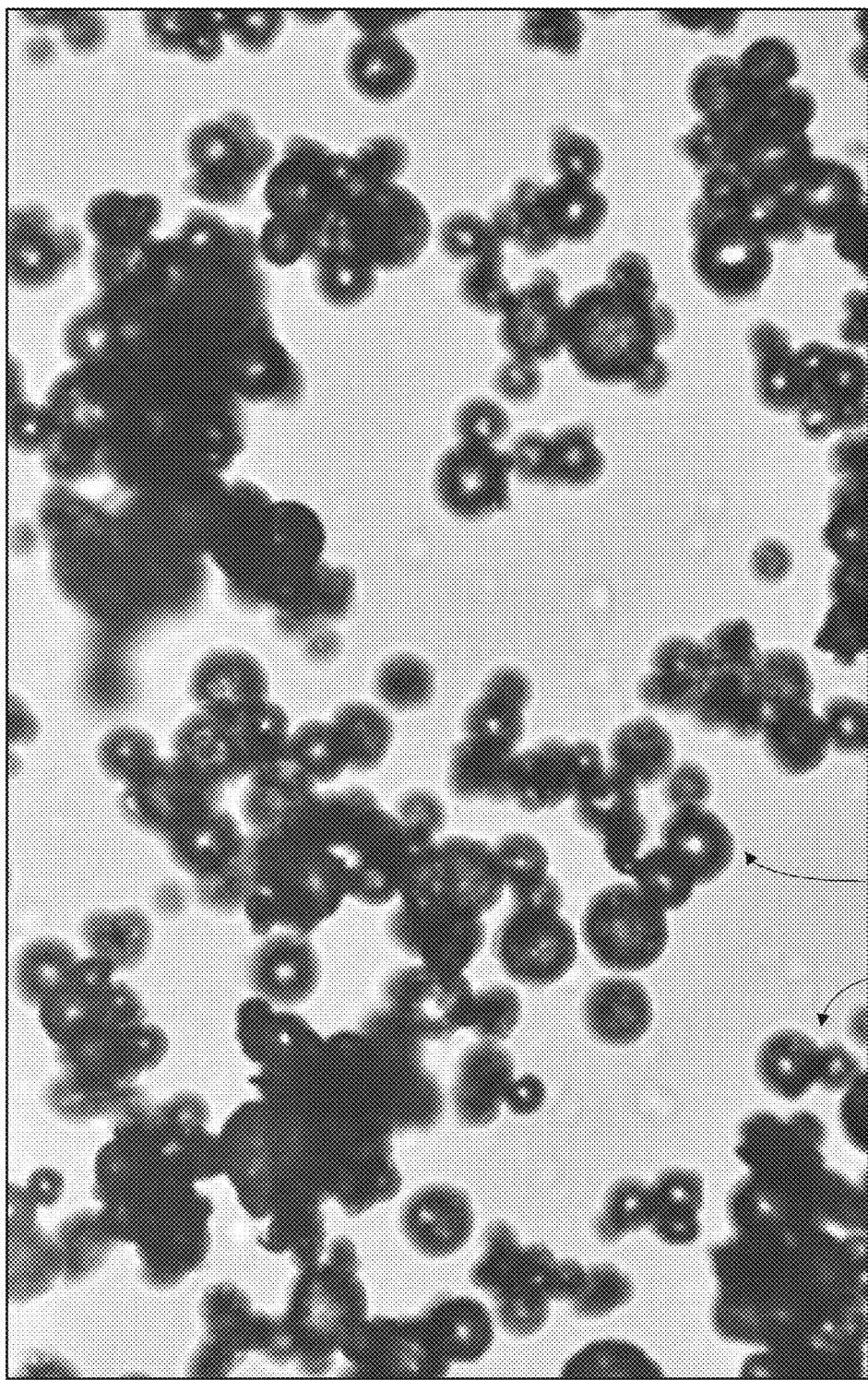
FIG. 4 is a microscopic image, at 10 times magnification, of boehmite coated microcapsules containing a carboxylic acid core made per the shell formation process of FIG. 1.
Figure 5:
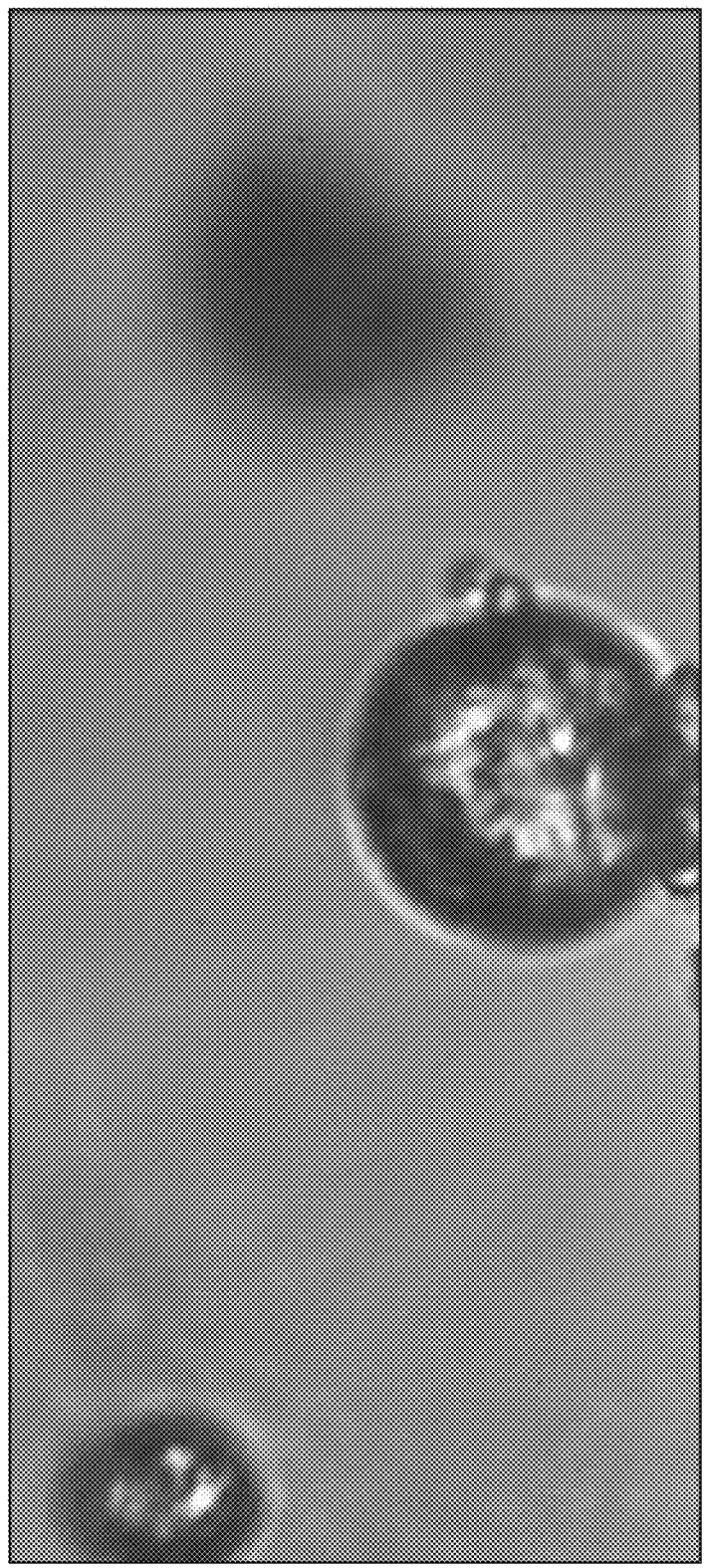
FIG. 5 is a microscopic image at 60 times magnification of the boehmite coated microcapsules of FIG. 3.

Additional images of the dodecanoic-boehmite mono-microcapsules are provided in FIGS. 4 and 5 at different magnifications.

Figure 7:
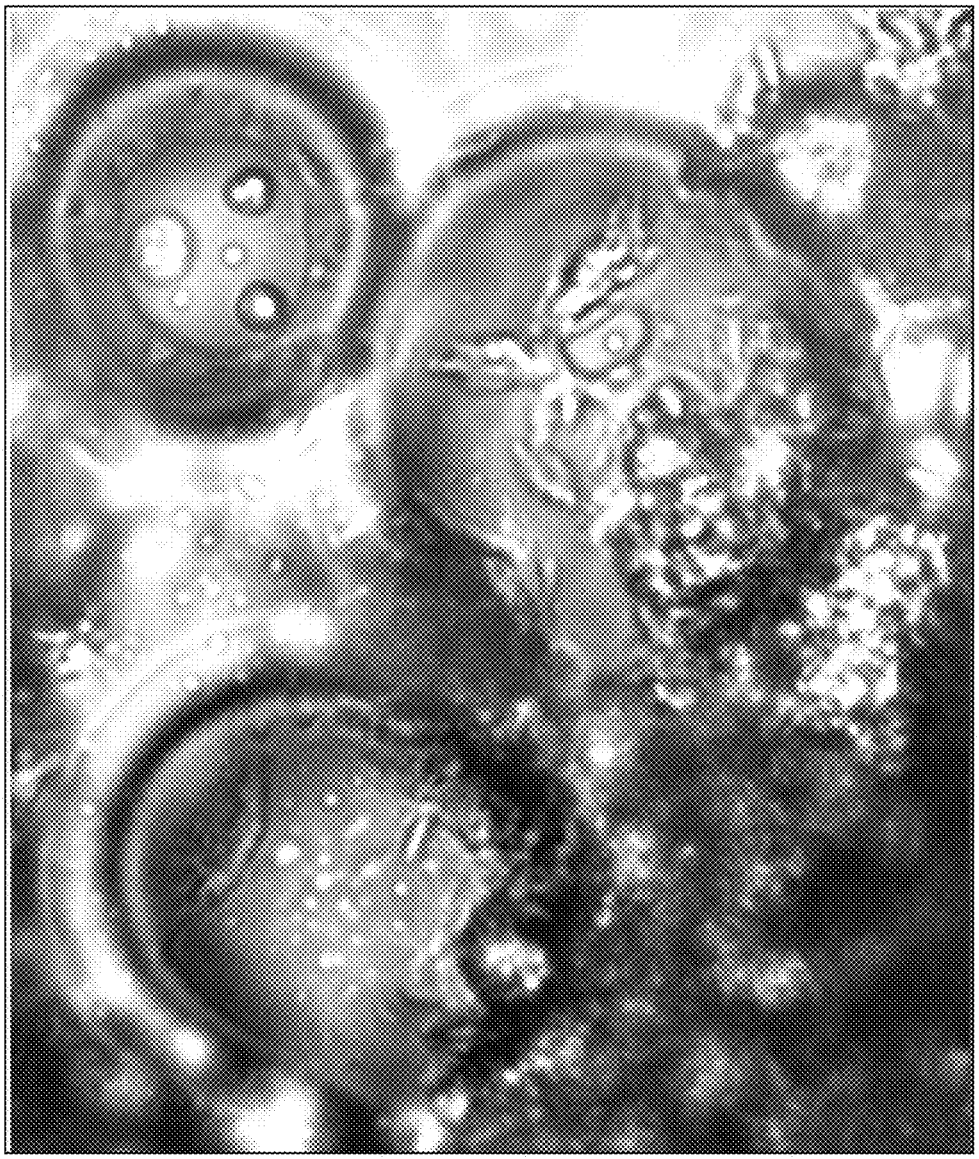
FIGS. 7 and 8 are microscopic images of boehmite coated microcapsules at 60 times magnification at a rupture time $T_0$.
Figure 8:
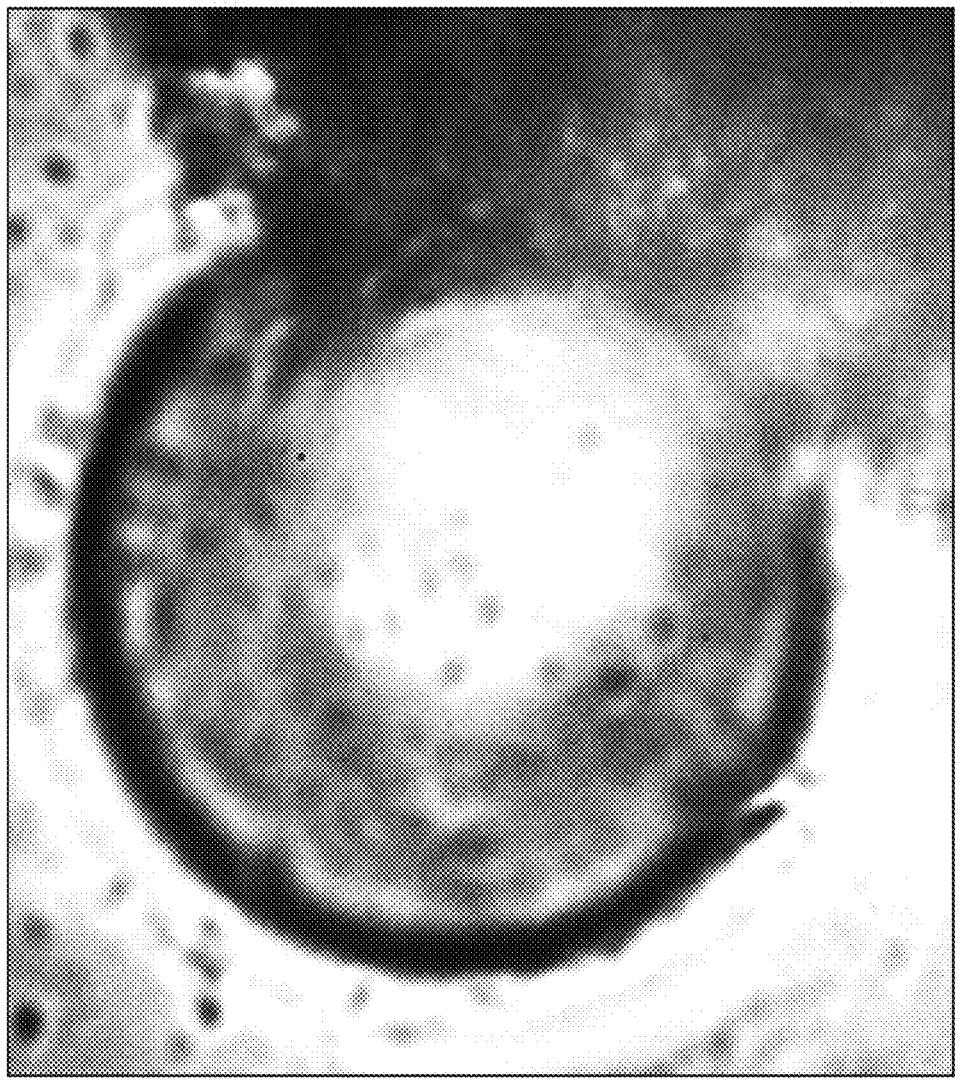
Figure 9:
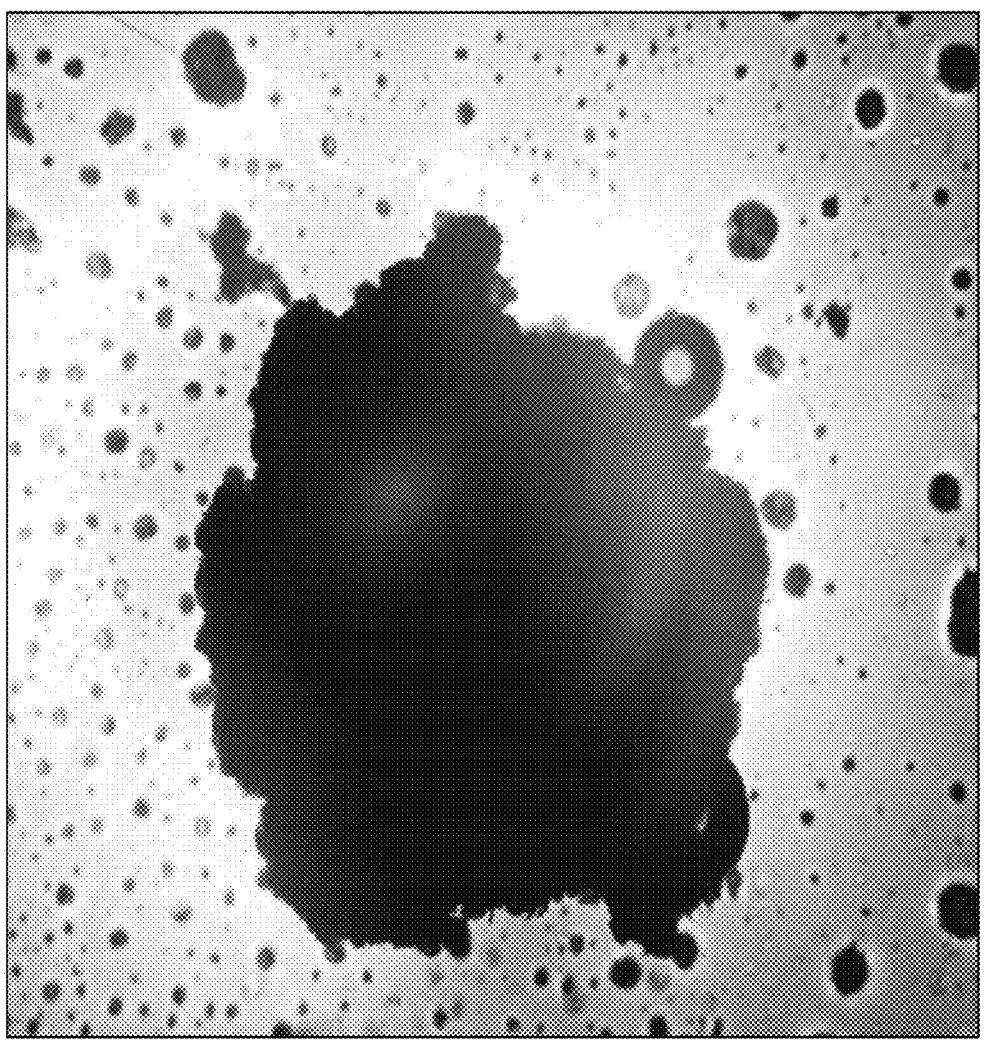
FIG. 9 is a microscopic image of boehmite coated microcapsules at 40 times magnification at a rupture time $T_4$.
Figure 10:
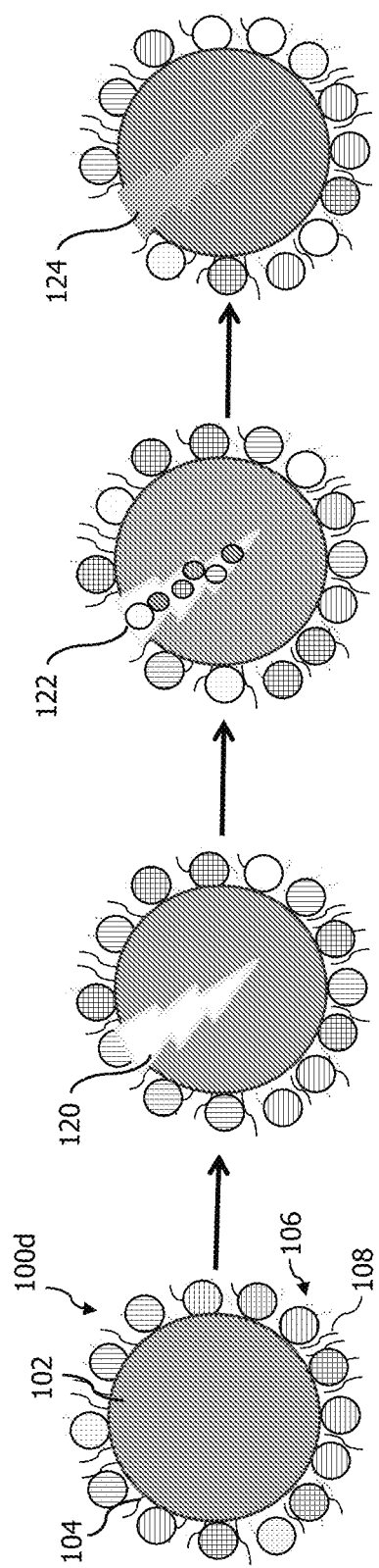
FIG. 10 is a schematic illustration of the rupture and dual reagent chemical reaction resulting in a self-healed microcapsule.

Now turning to FIGS. 7-10, images and a schematic representation of the dodecanoic-boehmite mono-microcapsules 100d upon rupture 120 of the microcapsules are shown. As labeled in FIG. 10, when the microcapsules rupture, the reagent in the core contacts the reagent on the exterior surface 122 of the capsules, a chemical reaction occurs that produces a reaction product 124 that fills in the crack produced by the rupture or that fills in a crack or mar in the surface to which the microcapsules were applied, such as the surface of a ship or beam of a bridge, etc. This chemical reaction is shown in FIGS. 7 and 8 at 60× magnification at the initial rupture of the microcapsules. FIG. 9 is the chemical reaction at 40× magnification four hours after the initial rupture of the capsules (i.e., $T_4$), demonstrating how much reaction product is formed and obscuring the original microcapsule. Here, the reaction product is carboxylate-alumoxane, which is a self-healing material. Typically, the resulting carboxylate-alumoxane has a curing time of 2-5 hours, which is ideal for the material to flow into and fix a crack or mar on a surface. The carboxylate-alumoxane is stable up to 350° C., is cheap to produce, and is insoluble in aqueous solutions, which is ideal for use in pipe coatings, in steel beams that are underwater, and on the exterior of ship hulls.

The rupture of the polymer wall may be by any means, such as mechanical or chemical means, for example, a scraping or marring of a surface or as a result of a pH change, such as an alkaline condition.

Based on the above description and working examples 1-5, the core composition 102, in one embodiment, comprises a carboxylic acid. The carboxylic acid is preferably one that reacts with a metal-containing compound to form a self-healing reaction product. Example carboxylic acids include decanoic acid, dodecanoic acid, heptadecanoic acid, tetradecanoic acid, palmitic acid, stearic acid, octanoic acid, and combinations thereof. The selection of the carboxylic acid, whether it is a mono-, di-, tri-, etc. carboxylic acid, changes the structure of the self-healing product. The carboxylic acid core can consist of a carboxylic acid functionalized graphene oxide (resulting in 0-D, sheet-like crystal structures), monocarboxylic acid (resulting in 1-D fibrous, wire-like structures), a dicarboxylic acid (resulting in 2-D sheet-like rods having a crystalline structure), a tricarboxylic acid (resulting in 3-D cube-like crystalline structures), and so on.

The pre-formed capsules 100 and the resultant capsules 100c, 100d can be microcapsules or macrocapsules, which will typically have a relatively high payload of the core material relative to the amount of material forming the shell or capsule wall. The payload of core material in any of the capsules may be about 10% to about 90% by weight, preferably at least 50%, more preferably at least 70%, and even more preferably at least 80%. In any of the capsules made by the methods disclosed herein, the payload of core material may be about 70% to about 80% by weight, more preferably about 75% to about 85%, and even more preferably about 77% to about 81%.

The size of the resultant capsules 100c, 100d can vary depending upon the size of the pre-formed capsules 100 used and the amount of shell material deposited on the polymer wall 104 of the pre-formed capsules 100. A microcapsule is typically one having a diameter in the range from about 1 μm to about 1000 μm. Microcapsules useful in the applications discussed herein more typically have a diameter from about 10 µm to about 600 µm. The capsule diameter selected depends upon a user's intended application or use for the capsules.

The pre-formed capsules 100 have a polymer wall 104, which may comprise melamine formaldehyde, gelatin, a cross-linked melamine, acrylic polymer, a phenolic resin polymer, or other known wall material made using known methods such as in-situ polymerization, interfacial polycondensation, interfacial cross-linking, or any other known method. Melamine-formaldehyde (MF) capsules and phenolic resin polymer capsules can be prepared by the in-situ polymerization process of polycondensation, where the melamine-formaldehyde prepolymer or urea resorcinol formaldehyde prepolymer or urea resorcinol glutaraldehyde prepolymers is initially soluble in the continuous water phase, while a hydrophobic core material is contained in dispersed droplets. As the polymerization reaction starts in the aqueous solution, the formed oligomers start to collapse on the surface of the core droplets. On the surface, the polymerization continues and crosslinking occurs, which results in the formation of a solid wall.

Capsules having a gelatin wall encapsulating a core material are known, as taught in Onder et al. *Encapsulation of Phase Change Materials by Complex Coacervation to Improve Thermal Performances of Woven Fabrics*, Thermochimica Acta. 2008, 467, 63-72, and in Patrick et al. *Optimization Process by Complex Coacervation of Fish Oil Using Gelatin/SDS/NaCMC and Secondary Coating Application with Sodium Polyphosphate*, IJSBAR. 2014, 17, 74-94.

For a cross-linked melamine microcapsule, reference is made to co-owned U.S. Pat. No. 10,005,059 for methods of making the microcapsule, which is incorporated herein by reference. These microcapsules are made from a melamine formaldehyde prepolymer comprising a crosslinking agent, the crosslinking agent being a mixture of:

(a) a reaction product of a cyclic urea (U) and a multifunctional aldehyde (A), and (b) at least one crosslinker selected from the group consisting of (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, (b8) multifunctional carbodiimides, wherein any of the crosslinkers (a) and (b) which have hydroxyl groups may be etherified with one or more linear, branched, or cyclic aliphatic alcohols, polymerized by adjusting the pH and/or addition of urea. The crosslinking agent (b) is preferably at least one crosslinker selected from the group consisting of (b1), (b2), (b3), and (b5). These cross-linked melamine microcapsules have MF prepolymer present in a ratio by weight percent to the crosslinking agent of 1:1 to 4:1, more preferably 1.5:1 to 3.75:1. These capsules have an initial free formaldehyde level of less than 100 ppm, more preferably less than 80 ppm, less than 60 ppm, and even more preferably less than 40 ppm. Such a crosslinking agent is available from Allnex USA Inc.

In one embodiment, the crosslinking agent has the reaction product of a cyclic urea U and a multifunctional aliphatic aldehyde (A), portion (a), in a mixture with one or more of (b1), (b2), (b3) and (b5). Mixtures of the reaction product of a cyclic urea (U) and a multifunctional aldehyde (A) and at least one of the crosslinkers (b) have a ratio of the mass of the reaction product to the mass of the crosslinker (b) (or to the sum of the masses of all crosslinkers (b)) from 1/99 to 99/1, preferably from 10/90 to 90/10, and more preferably from 30/70 to 70/30.

The multifunctional aldehyde A has the formula OHC—R'—CHO where R' may be a direct bond or a divalent radical which may preferably be a linear, branched or cyclic aliphatic radical and may have from one to twenty carbon atoms, both these options for R' leading to a divalent aldehyde having exactly two —CHO groups, or an aliphatic divalent radical which may be linear, branched or cyclic and may have from one to twenty carbon atoms, which radical carries at least one additional aldehyde group —CHO, which latter option leads to trivalent or polyvalent aldehydes having at least three aldehyde groups. Preferred aldehydes are divalent aliphatic aldehydes, particularly glyoxal, malonic dialdehyde, succinic dialdehyde, and glutaric dialdehyde. Especially preferred is glyoxal in an aqueous solution, as anhydrous solid which has to be cooled as its melting temperature is 15° C., or in the form of its dimer or trimer, optionally in solid hydrated form as dihydrates, or in the form of its addition products with sulfites or hydrogen sulfites which decompose under acidic conditions.

The cyclic ureas U which may be used according to the present invention have at least one unsubstituted amidic —NH group. These cyclic ureas are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. Hydroxy functional ureas are not useful for the present invention. The cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, at least one cyclic urea is selected from the group consisting of ethylene urea, 1,2-propylene urea, hydantoin also known as glycolyl urea, and parabanic acid also known as oxalyl urea, and glycoluril. A particularly preferred combination is glyoxal reacted with ethylene urea, and optionally, either glyoxal, or ethylene urea, or both, in mixture with other multifunctional aldehydes and/or other cyclic ureas. In a preferred case of using ethylene urea as the cyclic urea, and glyoxal as the multifunctional aldehyde, —R'— is a direct bond, and —X— is —NH—$CH_2$—CH. Additional details are found in the co-pending application referenced above.

A melamine formaldehyde resin particularly suitable for the above cross-linked melamine capsules is CYMEL® 385 melamine formaldehyde resin available from Allnex USA Inc. The melamine formaldehyde resin may be one that includes phenol, such as a resorcinol urea formaldehyde resin.

One example method of making microcapsules that have an acrylic polymer wall is disclosed in U.S. Patent Application Publication No. 2015/0158003, published Jun. 11, 2015, which is incorporated herein by reference. Another example method of making acrylic polymer walls is disclosed in U.S. Pat. Nos. 6,200,681; 7,572,397; 7,892,644; 8,535,558; and 9,181,466.

An example method of making a resorcinol urea formaldehyde (RUF) phenolic resin polymer is found in Working Example 4 below. An example method of making a poly(ureaurethane) (PUU) polymer wall is found in Working Example 8 below. An example method of making an aluminum oxide-hydroxide wall is found in Working Example 9 below.

Of the potential wall materials discussed herein, RUF polymer walls result in corrosion responsive shell material that can be seen as a function of an increase in pH over time. FIG. 15A through FIG. 16B demonstrate this ability, where at T=0 at a pH of 7.0 (FIG. 15A), the capsule wall appears to have an off white/cream color. Then, a sodium hydroxide solution at a pH of 12 is applied to the capsules, and after two minutes at this pH, the capsule walls turn pinkish to light orangish color. After five minutes of this elevated pH (FIG. 15C), the capsule walls turn a reddish-brown color, and the capsule walls begin to break. After about 4-5 hours at this pH level, the carboxylic acid core breaks out of the capsules and reacts with the outer nano-boehmite wall, which then form microfibrous carboxylate-alumoxane material. Fiber growth is complete after about 18-24 hours, see FIG. 16A, and appears as a white fibrous material. At a pH 9-11, capsule rupture will occur, along with carboxylate-alumoxane formation, but at a slower rate than at a pH of 12. For example, at a pH of 9, the capsules rupture within 24-48 hours and carboxylate-alumoxane formation occurred in about a week. At a pH 10, the capsules rupture within 12-24 hours and carboxylate-alumoxane formation occurred within 3-4 days. The RUF polymer walled capsules will be very useful in applications where corrosion is an issue.

The surfactant used to tether the shell to the polymer wall of the pre-formed microcapsules comprises an ionic surfactant. In one embodiment, the ionic surfactant may be mixed with a nonionic surfactant. The surfactant can affect the size of the inorganic coated capsules, as agglomeration can occur with some surfactant/shell system combinations, and the stability of the shell. For example, an inorganic shell may detach from the polymer wall of the capsule 100 at a temperature of about 200° C. if it is not well bonded thereto. Most capsule walls are stable up to and about 300° C. to about 400° C.; thus, degradation at 200° C. is indicative that the surfactant is not tethering the metal to the polymer surface of the capsule.

Cationic surfactant can include, for example, amine salts, such as, ethoxylated tallow amine, cocoalkylamine, and oleylamine, quaternary ammonium compounds such as cetyl trimethyl ammonium bromide, myristyl trimethyl ammonium bromide, stearyl dimethyl benzyl ammonium chloride, lauryl/myristryl trimethyl ammonium methosulfate, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, cocoyl hydroxyethylimidazolinium, or a mixture thereof. In some embodiments, the cationic surfactant is cetyl trimethyl ammonium bromide.

Suitable anionic surfactant include, but are not limited to, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate (SDBS), sodium dialkylsulfosuccinates, dioctyl sulfosuccinate, sodium dilaurylsulfosuccinate, poly(styrene sulfonates) and salts thereof, isobutylene-maleic anhydride copolymer, gum arabic, sodium alginate, carboxymethylcellulose, cellulose sulfate and pectin, isobutylene-maleic anhydride copolymer, carrageenan; semi-synthetic polymers such as sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates.

Example nonionic surfactants include, but are not limited to, ethylene maleic anhydride (EMA), sorbitan stearate (e.g., SPAN® 60), sorbitan monooleate (e.g., SPAN® 80), polyethylene glycol sorbitan monooleate (TWEEN® 80), polyvinyl alcohol, ethylene oxide/propylene oxide block copolymers (e.g., PLURONIC® P105), polyoxyethylene (5) nonylphenylether, branched (IGEPAL® CO-520), or a mixture thereof.

If the scheme set forth in FIG. 1 is utilized, the cation 110 attracted to the surfactant is a metal ion such as $Ca^{+2}$, $Mg^{+2}$, $Ag^{+1}$, $Co^{+2}$, $Co^{+3}$, $Ni^{+2}$, $Cu^{+1}$, $Cu^{+2}$, $Fe^{+2}$, $Fe^{+3}$, $Mn^{+2}$, $Zn^{+2}$, $Al^{+3}$, and $B^{+3}$, $Sn^{+2}$, $S^{n+4}$, $Cr^{+2}$, $Cr^{+3}$, but is not limited thereto. The anion 112 for forming the shell 106 is one that is insoluble in water when paired with the cation 110. Suitable anions include, but are not limited to, one or more of $CO_3^{-2}$, $HPO_4^{-2}$, $PO_4^{-3}$, $SO_4^{-2}$, $SO_3^{-2}$, $OH^{-1}$, $H_2PO_4^{-1}$, $HSO_4^{-1}$, and $HSO_3^{-1}$, $CrO_4^{-2}$, $MnO_4^{-2}$, $S_2O_3^{-2}$. Suitable anion equivalent includes graphene oxide, amines, and carboxylates. Some example amines include primary amines such as diethylenetriamine (DETA) and diethylamine (DEA). Some examples of carboxylates include octadecanoate ions, dodecanoate ions, and hexadecanoate ions.

Referring to FIGS. 1 and 2, the outer shell 106 is deposited onto the existing polymer wall of microcapsules 100 in an aqueous solution at temperatures between about 20° C. to about 70° C. In preferred embodiments, and those used in the working examples, the average capsule size (diameter) for the pre-formed capsules 100 ranges from about 2 μm to 85 μm. The polymer wall 104 is used as a scaffold in which a surfactant 108 can be applied, where the surfactant 108 tethers the outer shell 106 to the exterior surface 105 of the polymer wall 104. Either ionic or nonionic surfactants can be used, but ionic surfactants are preferred. The surfactant 108 is dissolved in water, typically deionized water, which may be warmed. The surfactant solution typically has a concentration of about 0.5% to about 3% by weight relative to the weight of pre-formed capsules selected for the batch. The pre-formed capsules 100 are added to the surfactant solution (or vice versa) with stirring for sufficient time to allow the surfactant 108 to tether to the polymer wall 104 thereof, thereby forming intermediate capsules 100a.

After the surfactant 108 is applied to the polymer wall 104, if following the scheme of FIG. 1, a solution of metal cations 110 ($X^+$) is added dropwise into the aqueous solution of intermediate capsules 100a, preferably with stirring for a sufficient time to allow the cations to be associated/attracted to the surfactant. Before the dropwise addition, a metal compound that is soluble in water was dissolved in water, with heat if appropriate. The metal-containing solution comprised of 0.5% to about 25% by weight, more preferably about 1% to about 11% by weight, metal compound in deionized water was added dropwise to the surfactant-coated capsule-containing solution. The metal cations 110 are attracted to the surfactant 108 tethered to the exterior surface of the intermediate capsules 100a, thereby forming secondary intermediate capsules 100b.

Still referring to FIG. 1, in a separate container, the selected anion compound that is soluble in water is dissolved in water, typically with heating. The anion-containing solution is comprised of 0.5% to about 25% by weight, more preferably about 1% to about 13% by weight, anion compound in deionized water. This solution of anions 112 ($Y^-$) was added dropwise, in a similar manner to the addition of metal cation 110, to the solution of secondary intermediate PCM capsules 100b. The anion 112 must be insoluble in water with the previously added metal cation 112 in order to form a precipitated or deposited solid as a shell 106. After the anion 112 is added to solution, and enough time has been allowed for the shell 106 to form, the solution is filtered and washed several times in deionized water. The shell may comprise about 1% to about 10% by weight of each capsule, more preferably about 3% to about 8% by weight of each capsule.

EXAMPLE 1

With reference to the scheme illustrated in FIG. 2, preformed microcapsules having a core composition comprising dodecanoic acid were provided. To tether the secondary reagent to the exterior surface of the polymer wall of the microcapsules, 2.5 g of a surfactant, such as cetyl trimethylammonium bromide (CTAB), was dissolved in 300 g of deionized water and heated to 40° C. Then, 25 g of the pre-formed microcapsules were added to this solution with mixing until the surfactant was bound to the capsule's polymer wall.

Separately, 15 g of boehmite was dissolved in 300 g of deionized water and heated to 40° C. Boehmite has the following chemical structure (I), which has aluminum within its structure that is or becomes available to associate with the surfactant tethered to the polymer wall of the preformed microcapsules.

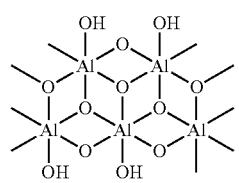

(I)

This boehmite solution was added dropwise to the solution containing the microcapsules with mixing until the aluminum was associated with (chemically connected to) the surfactant tethered to the microcapsules. The product was then washed several times in deionized water and vacuum filtered.

EXAMPLE 2

The procedure of Example 1 was repeated, but the CTAB was replaced in turn with sodium dodecylbenzenesulfonate (SDBS), polyvinyl alcohol (PVA), SPAN™ 60 sorbitan esters with sodium dodecylbenzenesulfonate (SDBS), and ethylene maleic anhydride (EMA) with sodium dodecylbenzenesulfonate (SDBS). Microcapsules having an inorganic shell of alumoxane resulted from each trial.

The preformed microcapsules may be made as a first part of any of the methods disclosed herein. Several examples are provided below demonstrating different polymer walls of the preformed microcapsules.

EXAMPLE 3: Melamine Formaldehyde Microcapsules

In one exemplary synthesis, 176.72 g of a surfactant such as ethylene maleic anhydride/diethylamine (EMA/DEA) (containing 2.5% EMA, 1.1% DEA, and 96.4% water) was mixed with 200 g of water and heated to 57° C. with stirring using an overhead mixer equipped with a turbine. Then, 241 g of a core material, here dodecanoic acid containing a 15% diluent such as octadecane, was added to the aqueous mixture of surfactant. A pH was maintained that was complementary to the core material. The pKa of dodecanoic acid is 4.9, so the pH of the surfactant solution was kept below 4.9 to avoid deprotonation of the core material. Upon addition of the core material, the stir speed was increased to about 300 rpm, and soon thereafter, a coacervate formed. After stir emulsifying for about an hour, wall materials were added.

In this example, the wall was a melamine formaldehyde (MF), in particular CYMEL® 385 resin. About 59 g of CYMEL® 385 resin was added to the core and surfactant coacervate, where 75% of the wall material was added 60 minutes after stir emulsifying, and the remaining wall material was added 70 minutes after stir emulsifying and homogenizing. After the first amount of wall material is added, the coacervate solution is homogenized to about 1 μm to about 100 μm diameter, more preferably about 10 μm to about 40 μm diameter microcapsules, and even more preferably about 15 μm to 25 μm diameter microcapsules using a homogenizer, for example one made by IKA Works, Inc. of Wilmington, N.C. Then, 25 minutes after the first CYMEL® 385 resin addition, 88 g of a salt solution such as potassium dihydrogen phosphate ($KH_2PO_4$) was added over 10 minutes. After the addition of the salt solution, the temperature of the solution was slowly raised to 85° C. Once the temperature was at 85° C., 16 g of urea was added, and the now formed microcapsules are allowed to cure at this temperature. After curing for 4 hours, the microcapsules were cooled to ambient temperature, the pH adjusted to 7 followed by vacuum filtering to recover the microcapsules.

EXAMPLE 4: Resorcinol Urea Formaldehyde Microcapsules

In one exemplary synthesis of a resorcinol urea formaldehyde (RUF) microcapsule, 160 g of a surfactant such as polyvinyl alcohol (PVA) (containing 50% PVA-540 solution and 50% PVA-125 solution, where both contain 5% solids and 95% water) is mixed with 150 g water and heated to 45°

C. with stirring using an overhead mixer equipped with a mixer turbine. Then, 148 g of a core material such as dodecanoic acid or octanoic acid, previously heated to 50° C., was added to the aqueous mixture of surfactant. Upon addition of the core material, the stir speed was increased to about 300 rpm, and soon thereafter, a coacervate formed. After stir-emulsifying for about an hour, the size of the capsules was obtained using a homogenizer, such as one made by IKA Works, Inc. of Wilmington, N.C. The size of the microcapsules ranges from about 1 µm to about 100 µm in diameter, more preferably about 10 µm to about 40 µm in diameter, and even more preferably about 15 µm to 25 µm in diameter. After the pre-selected diameter size was reached, the wall materials were added sequentially.

The wall material additions were: 6 g of urea, 11 g of resorcinol, 35 g of formaldehyde, and 80 g of water. The additions were made to the core and surfactant coacervate, where 33.3% of the wall material was added 60 minutes after stir emulsifying, 33.3% was added 60 minutes after the first wall addition, and the remaining wall material was added 120 minutes after the first wall addition. All wall materials were added to the coacervate dropwise. Furthermore, after the first wall addition, the pH of the emulsion was adjusted to be within the range of 1.5 to 2. After the last wall material was added, the temperature of the solution was raised to 50° C. and cured at this temperature for eight hours. After curing, the microcapsules were cooled to ambient temperature, the pH adjusted to 6 followed by vacuum filtering to recover the microcapsules.

Examples 3 and 4 were repeated with different carboxylic acids as the core materials, specifically, palmitic acid, stearic acid, heptadecanoic acid, and tetradecanoic acid, which were then treated according to the procedure of Example 1 to add an inorganic second reagent shell tethered to the polymer wall of the microcapsules by a surfactant.

EXAMPLE 5

In a synthesis of poly(ureaurethane) microcapsules containing a carboxylic acid core, 670 g of a polyvinyl alcohol (PVA) solution containing 1.8% PVA in deionized water, was heated to 50° C. and stirred. Alternately, 70 g of a colloidal silica solution such as Levasil CS50-28, 13 g of a 5% solution of hydroxypropylcellulose thickener such as Klucel, and 500 g of deionized water can be heated to 50° C. and stirred. To either mixture of 289 g of a previously heated carboxylic acid along with 51 g of isophorone diisocyanate was added to the PVA solution and stirred vigorously for 10 minutes in a stir emulsification. After 10 minutes of stir emulsifying, an Ika homogenizer was inserted into the solution and homogenized the solution for 6 minutes at 6500 rpm. Once the capsules reach the desired size (15-25 µm), the homogenizer is taken out of solution and 5 g of ethylene glycol is added dropwise to the resulting solution. After this has stirred for 10 minutes, 20 g of diethylene triamine, which was previously mixed with 50 g of deionized water, is added dropwise to the solution. After this has been added, the temperature is raised slowly over about 2 hours to 65-85° C. This temperature is maintained for 7-12 hours to cure, then the resulting solution is cooled to room temperature and washed several times in deionized water.

EXAMPLE 6

Figure 11:
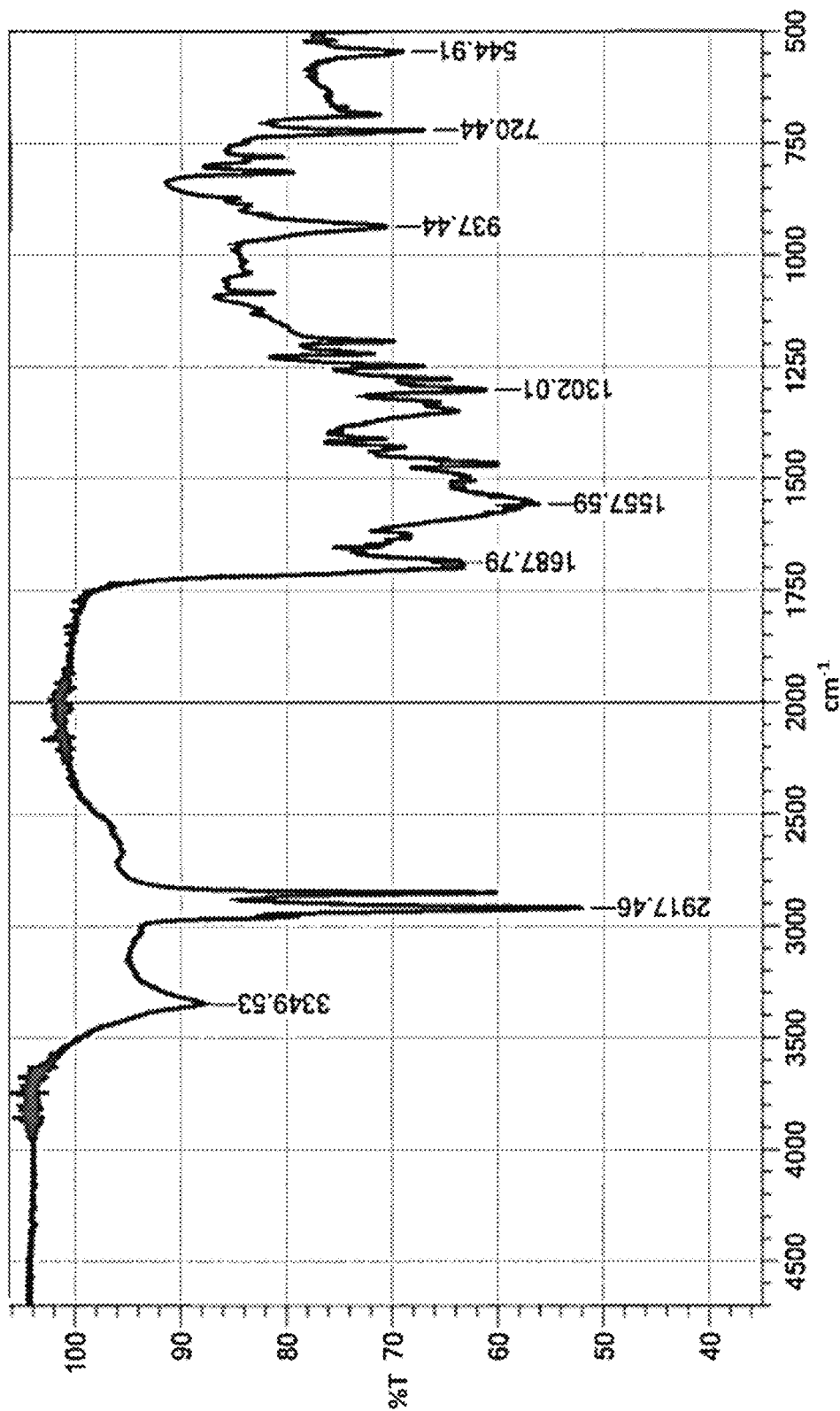
FIG. 11 is an FTIR image of a pre-formed microcapsule.
Figure 12:
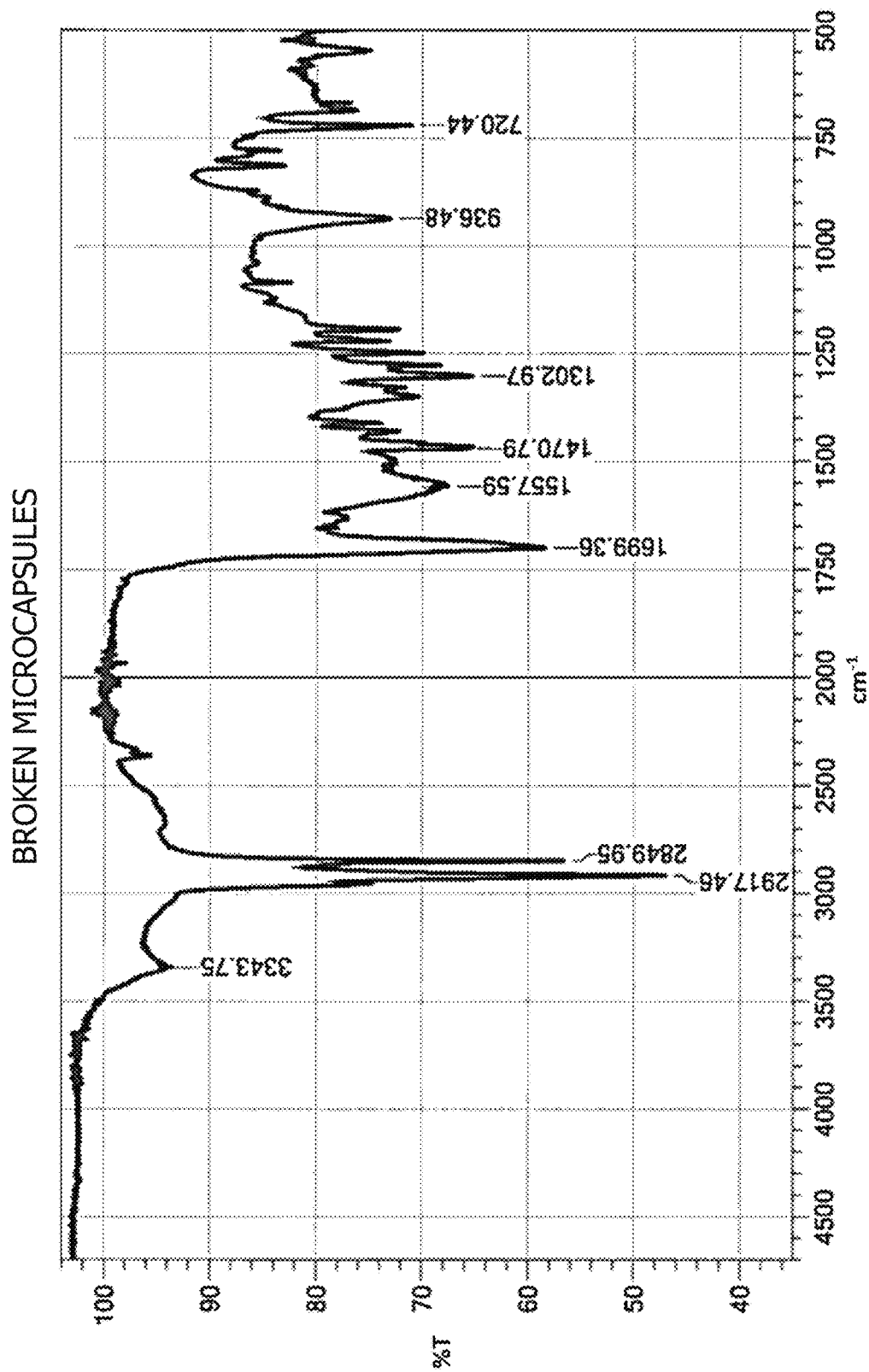
FIG. 12 is an FTIR image of a nano-boehmite before application onto a microcapsule.
Figure 14:
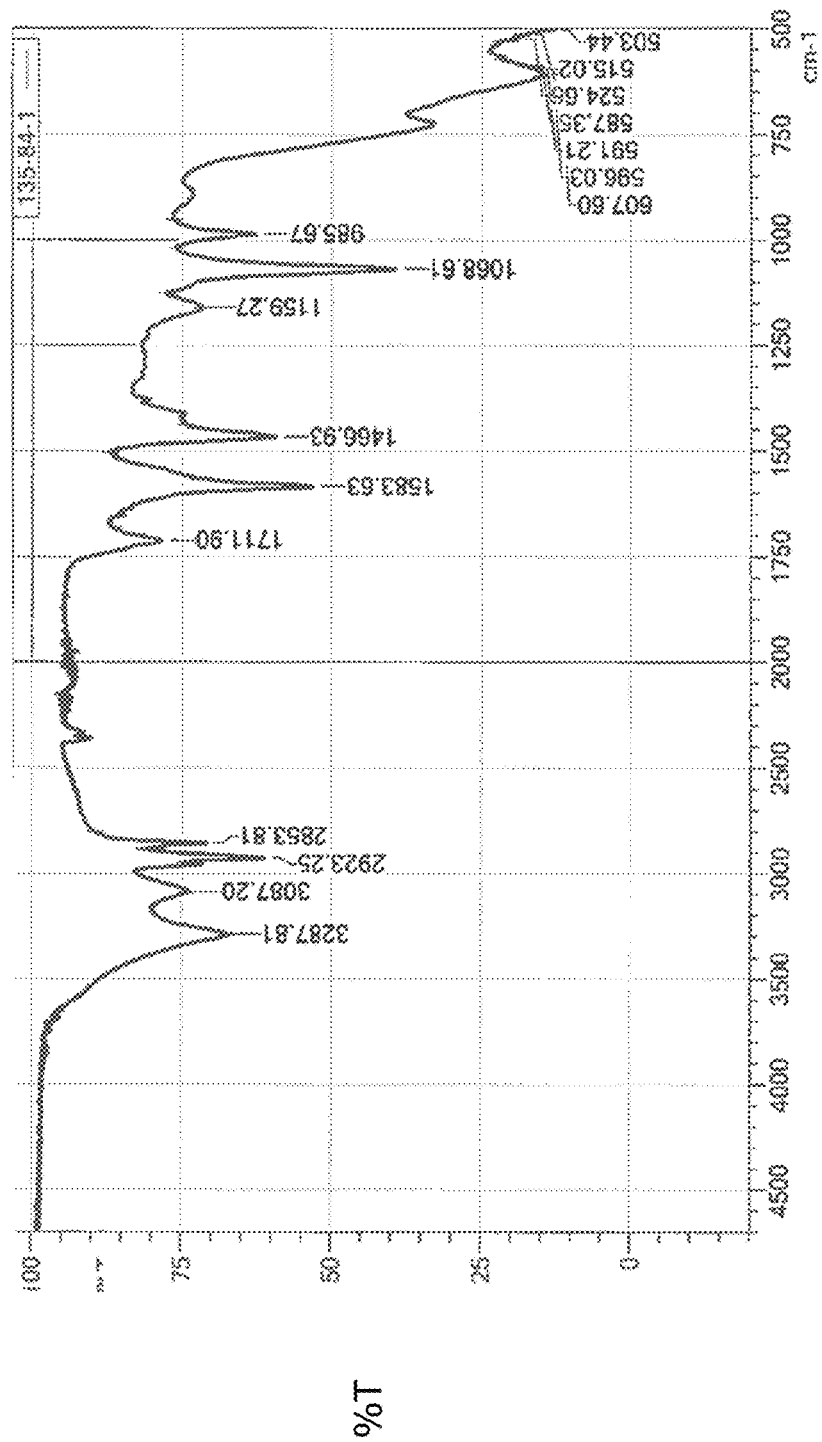
FIG. 14 is an FTIR image of a boehmite coated microcapsule after rupture.
Figure 15C:
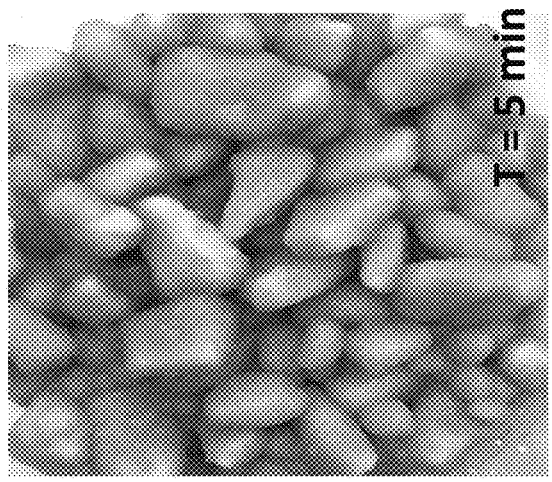
FIGS. 15A-15C are progressive time lapse images of RUF capsules containing a carboxylic acid core and a nano-boehmite outer shell after exposure to a sodium hydroxide solution of pH 12.
Figure 15B:
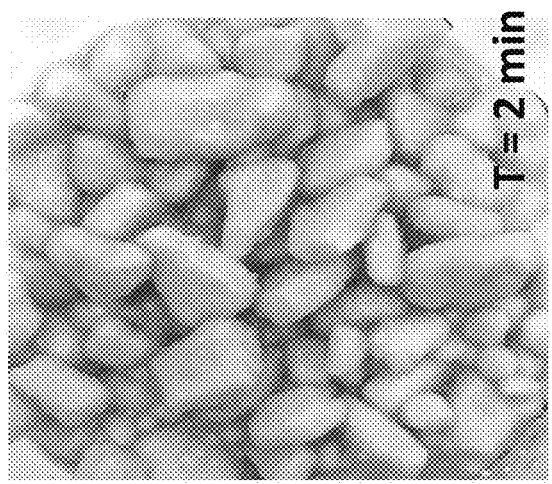
Figure 15A:
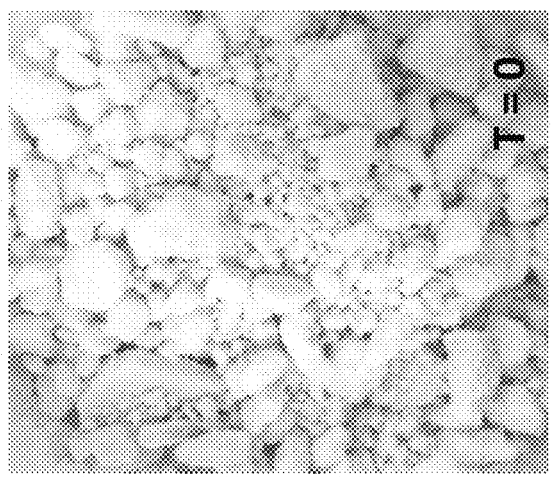

FTIR spectra of the dual reagent capsules of Example 1 were obtained (1) before rupture (whole microcapsules), and (2) after rupture. The FTIR images are included as FIGS. 11 and 12. Differences between the two FTIR images are found near 3300 $cm^{-1}$ and 1690 $cm^{-1}$, which indicate that a chemical reaction occurred. These capsules originally contain a carboxylic acid core, decanoic acid, where the reflection at 3349.53 $cm^{-1}$ in FIG. 11 indicates an O—H stretch, and the reflection at 1687.79 $cm^{-1}$ indicates at C=O stretch (i.e., a carboxylic acid is present). After the capsules rupture, the core (carboxylic acid) is exposed to the second reagent shell, boehmite (alumoxane), to react therewith. As seen in FIG. 14, the O—H stretch decreases significantly as well as shifts to a lower wavenumber, 3343.75 $cm^{-1}$. Furthermore, the C=O stretch increases to 1699.36 $cm^{-1}$. Both of these changes imply that the original carboxylic acid core has now become a carboxylate-alumoxane reaction product.

Figure 13:
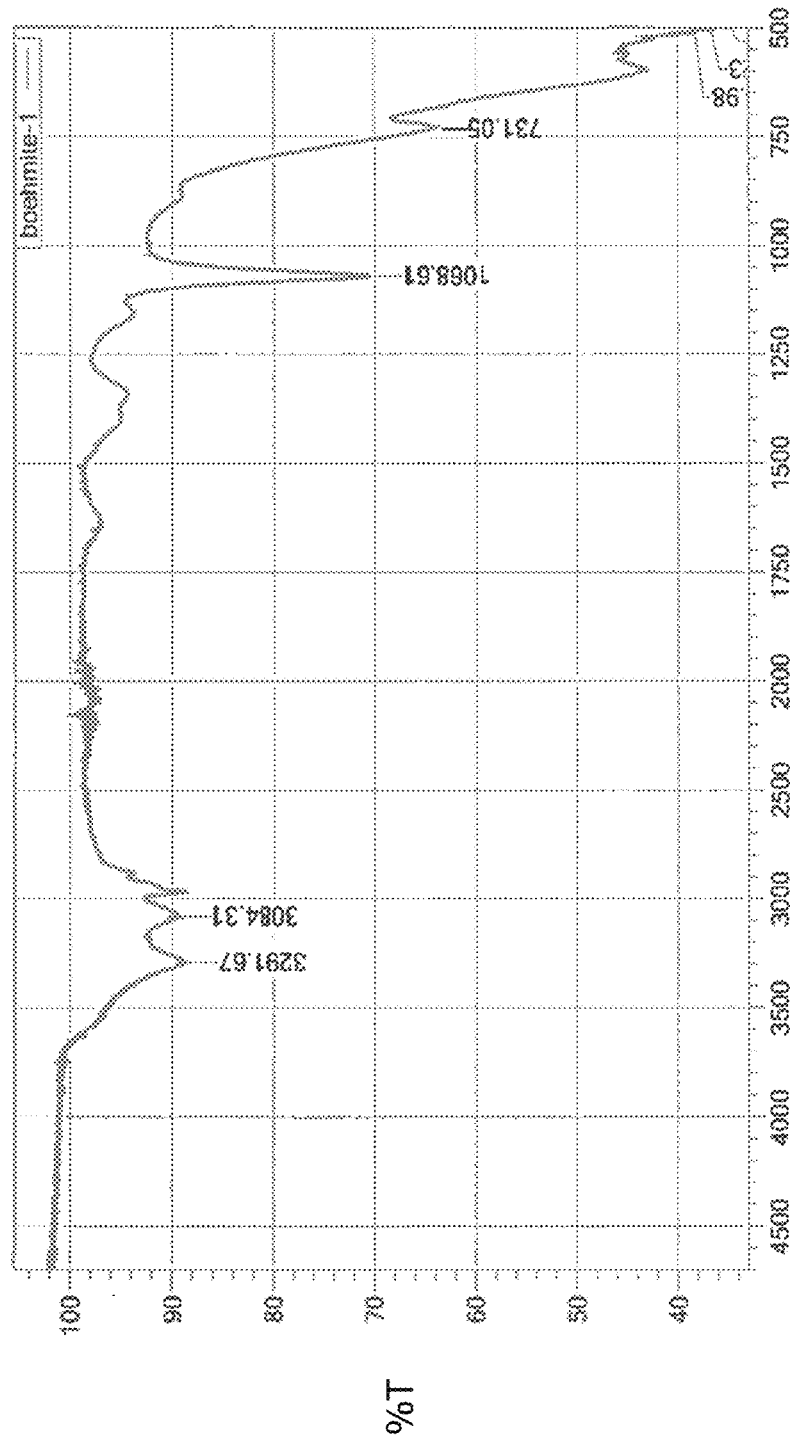
FIG. 13 is an FTIR image of a resorcinol urea formaldehyde (RUF) capsule containing a carboxylic acid core and having an outer shell of nano-boehmite tethered thereto by a surfactant.

With reference to Example 4, different carboxylic acid starting materials were selected for reaction with nano-boehmite and the carboxylate-alumoxane crystalline structures that resulted were analyzed using FTIR, TGA, and optical microscopy. A RUF capsule having an octatonic acid core and a nano-boehmite outer shell or coating was analyzed. FIG. 13 is the FTIR of nano-boehmite, where the peak at 1068 $cm^{-1}$ indicates the presence of an Al—O—Al bond. This same peak can be found in FIG. 14, which is the FTIR spectrum of a resorcinol urea formaldehyde (RUF) capsule containing a carboxylic acid core and having an outer shell of nano-boehmite tethered thereto by a surfactant. The presence of the Al—O—Al peak at 1068 $cm^{-1}$ as well as the carboxylic acid peaks found at 1711 $cm^{-1}$ and 1583 $cm^{-1}$, indicates that the capsules contain both of these starting materials.

Figure 16A:
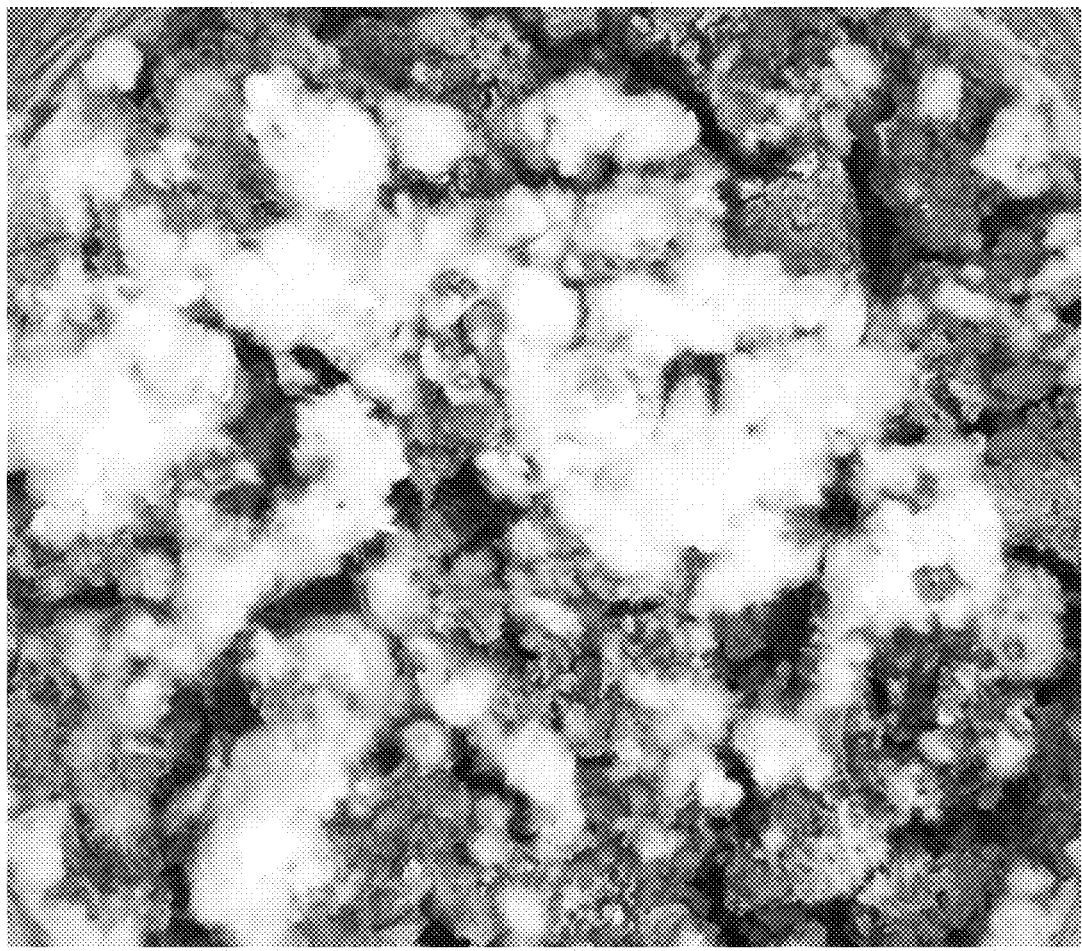
FIG. 16A is an image of the capsules of FIG. 15C after 24 hours, the white reaction product being a fibrous carboxylate-alumoxane.
Figure 16B:
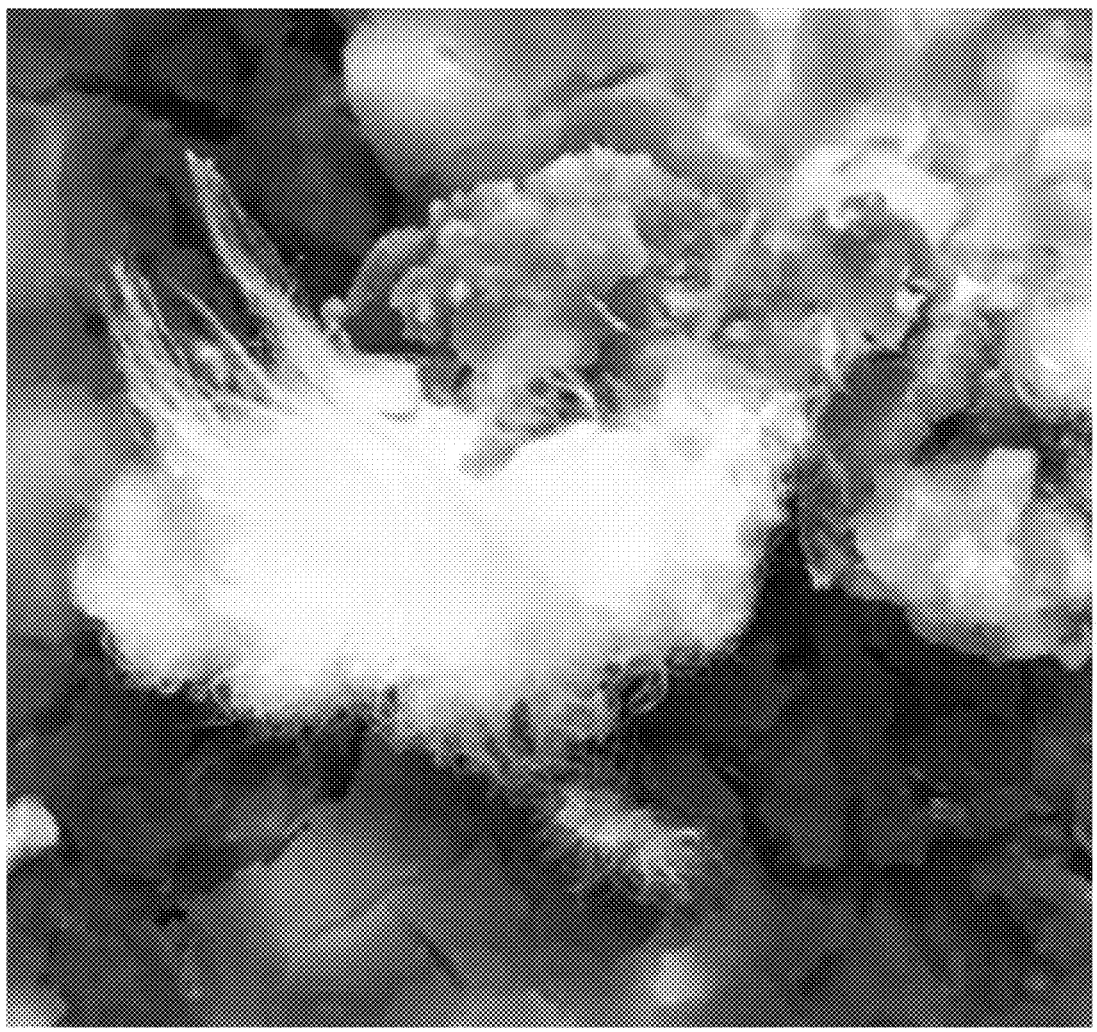
FIG. 16B is an enlarged view of a ruptured capsule within FIG. 16.
Figure 17A:
FIGS. 17A-17D are SEM images under differing degrees of magnification of a fibrous reaction product resulting from capsules having octanoic acid in the core and nano-boehmite tethered to a RUF polymer wall by a surfactant.
Figure 17B:
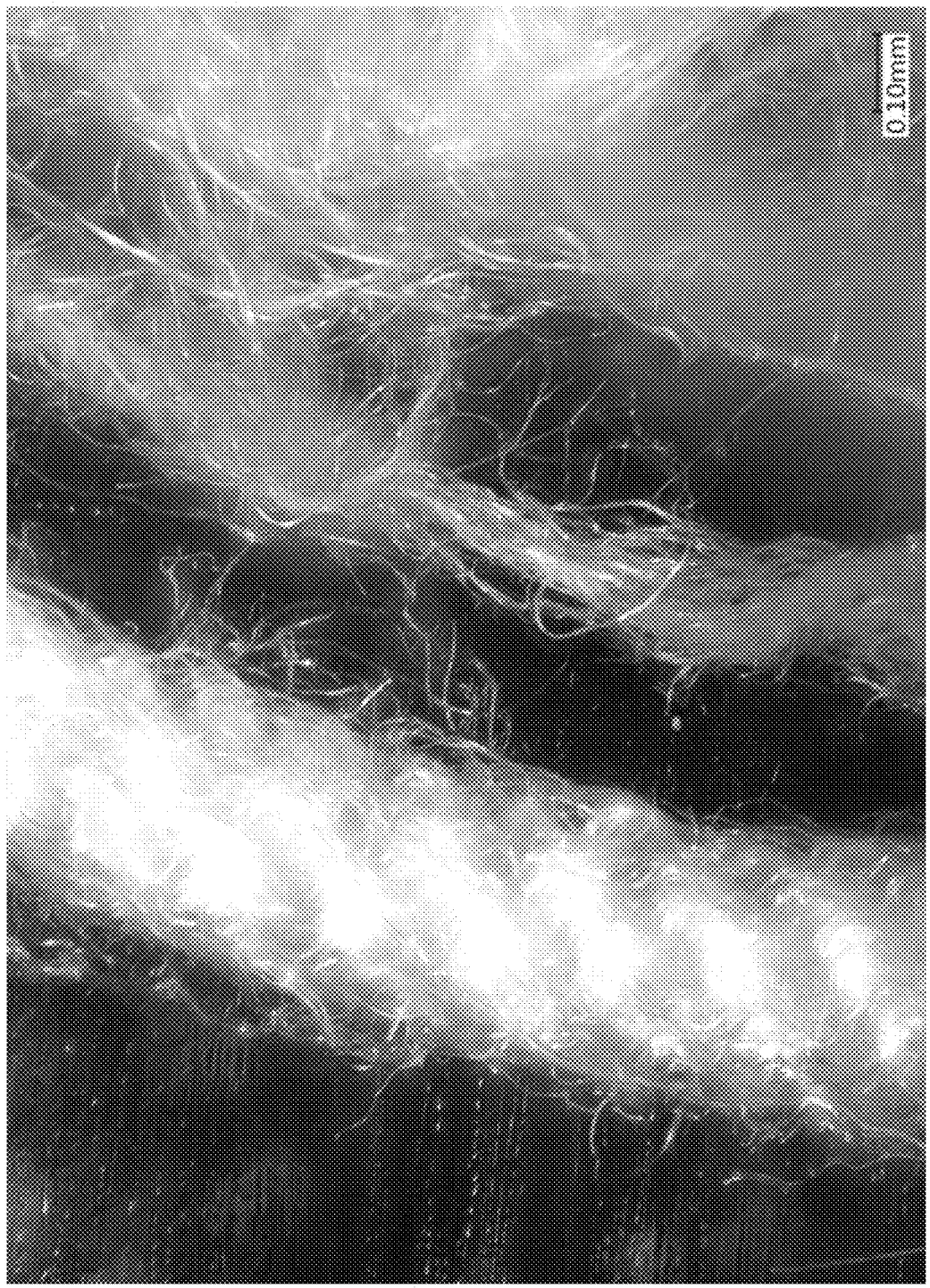
Figure 17C:
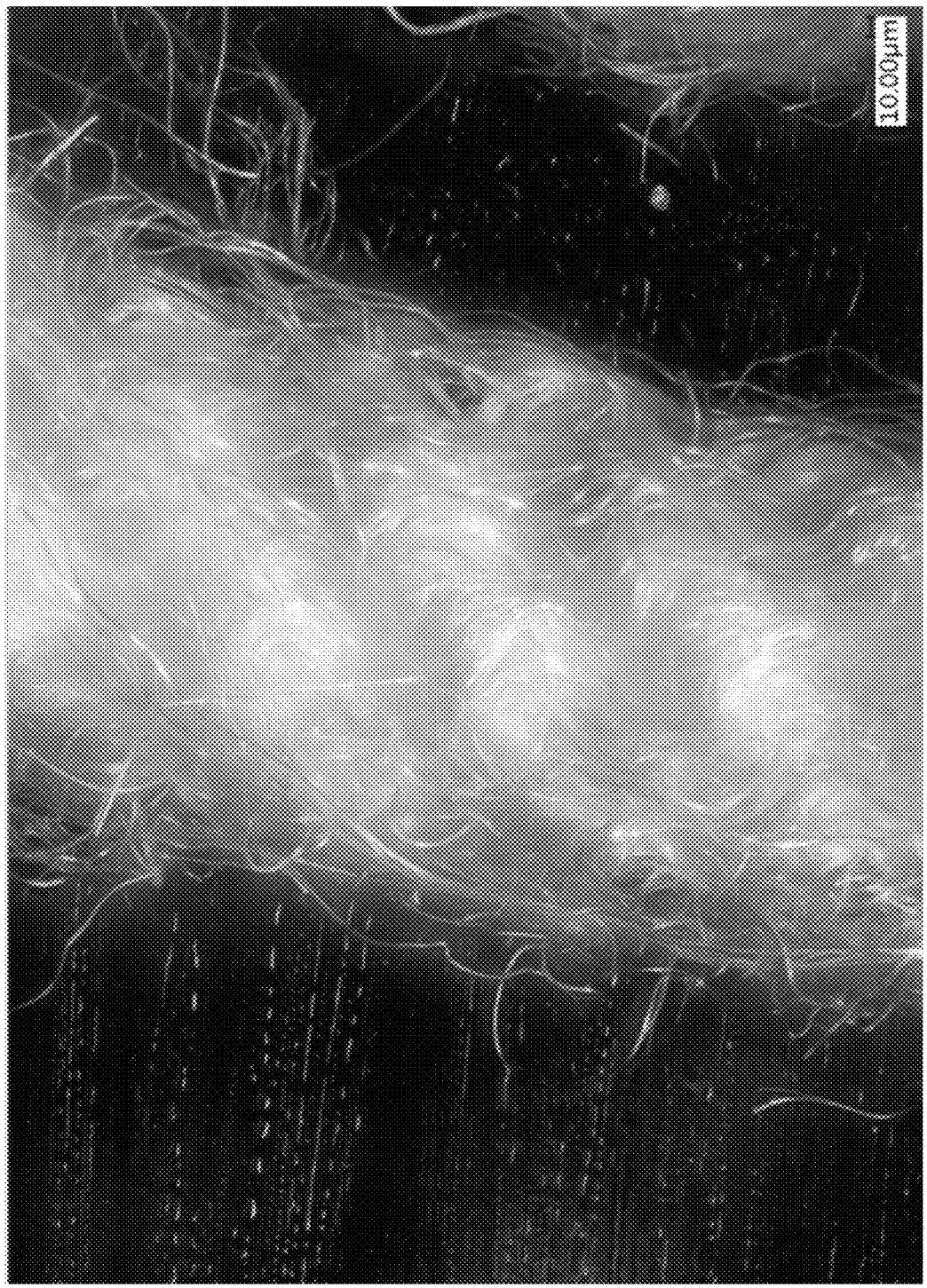
Figure 17D:
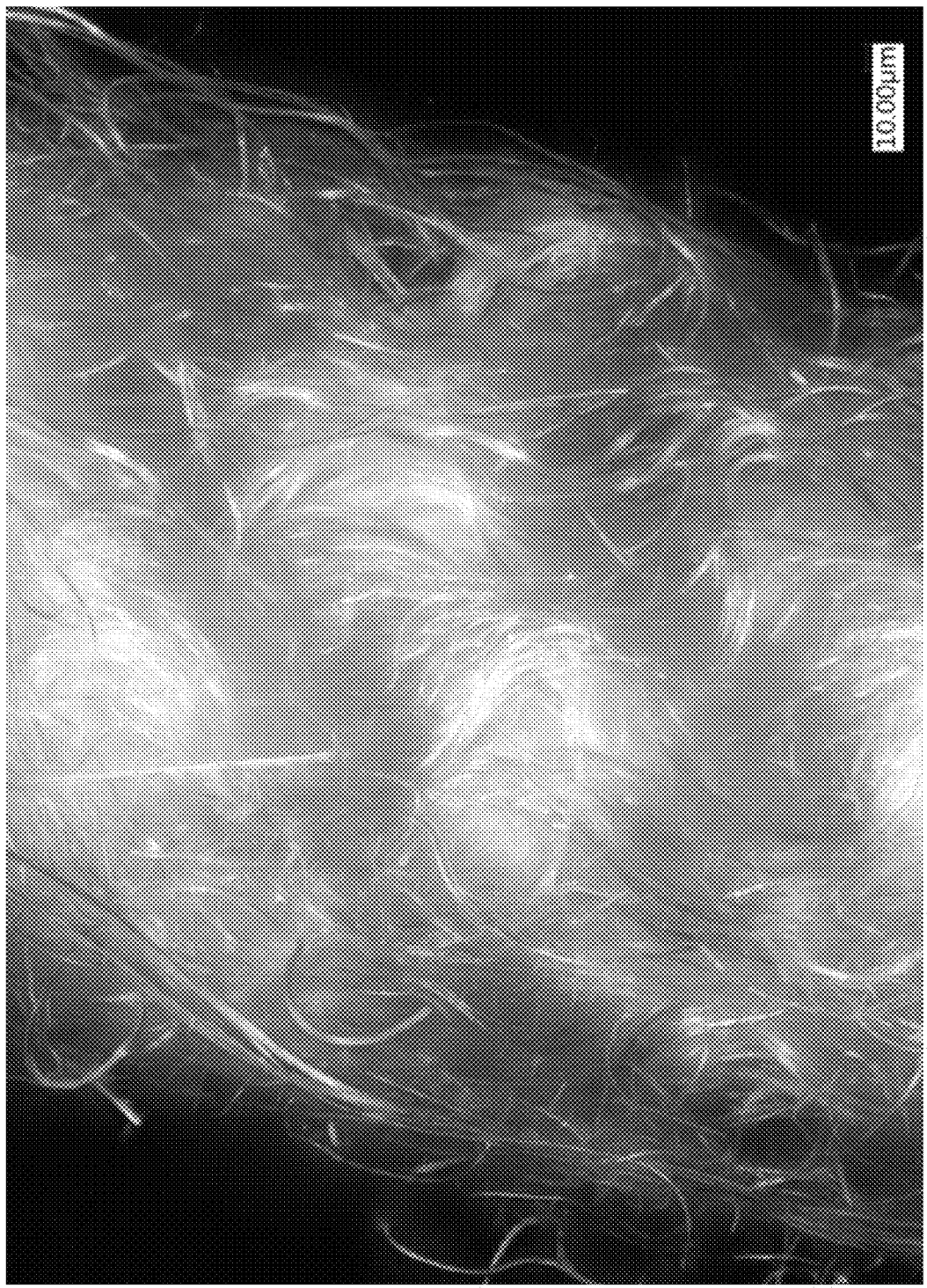
Figure 18A:
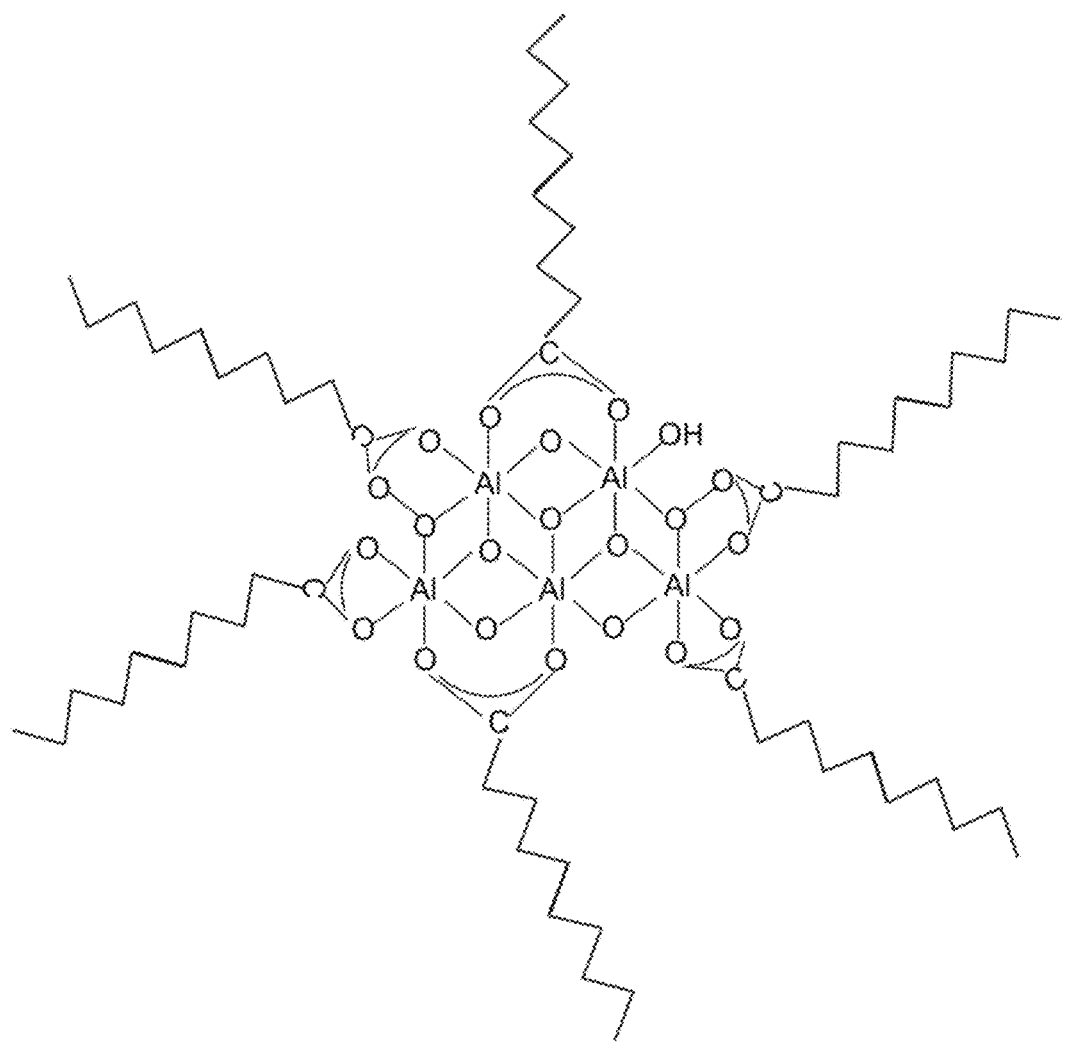
FIGS. 18A and 18B are representations of the molecular structure of the fibrous reaction product of FIG. 17A-17D.
Figure 18B:
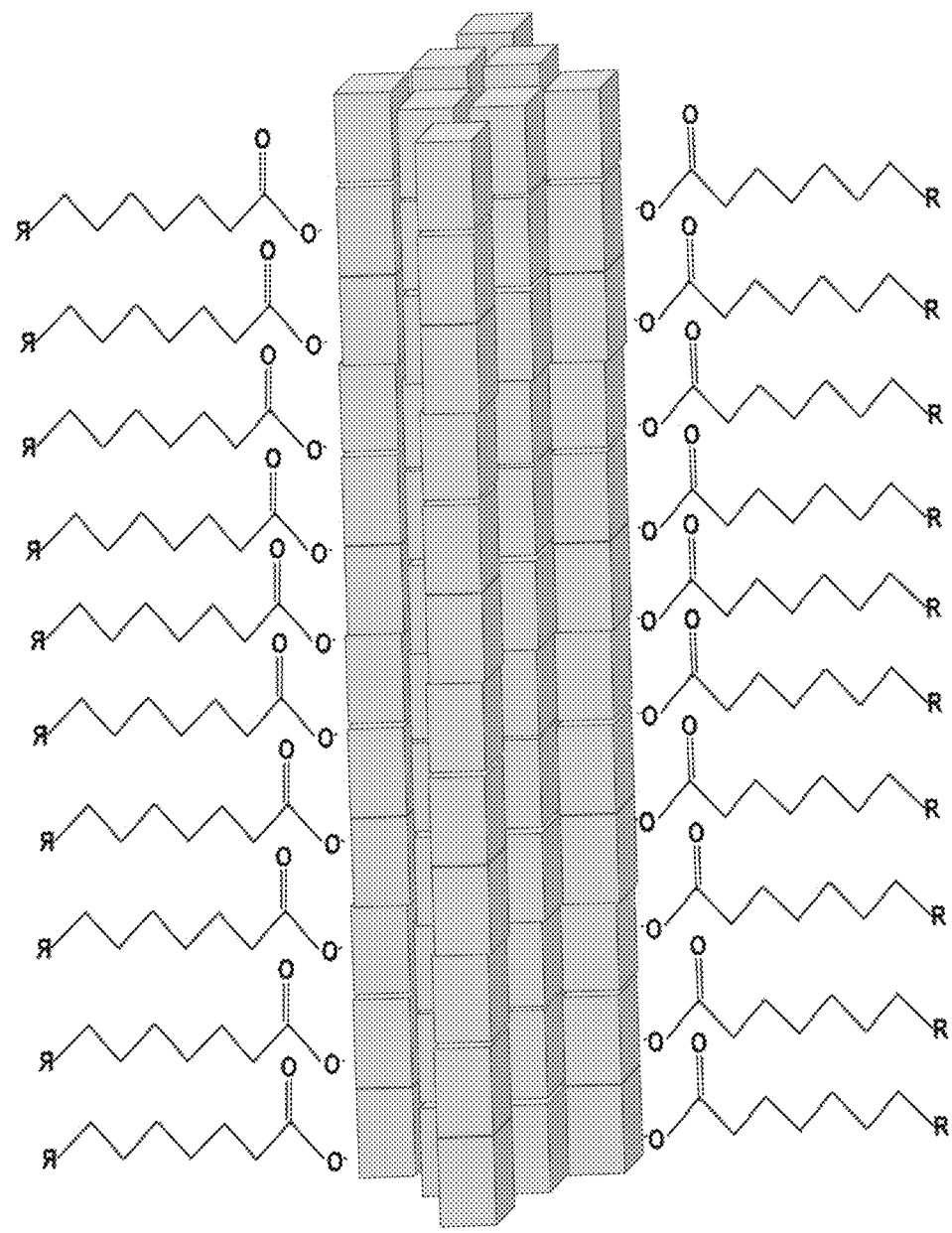
Figure 19:
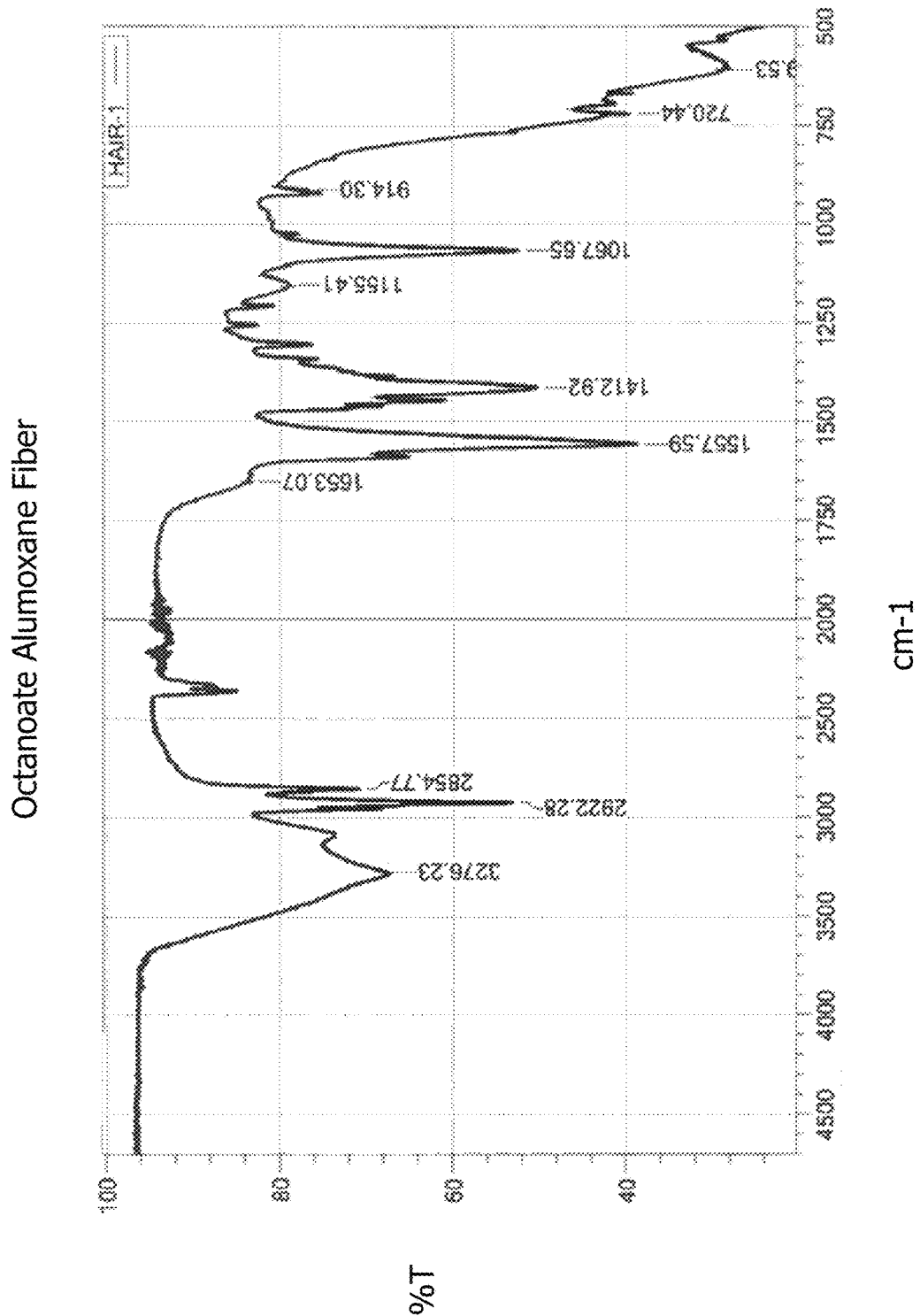
FIG. 19 is an FTIR spectrum of the fibrous reaction product of FIG. 17A.

The ruptured capsules have a white fibrous reaction product growing therefrom as seen in FIGS. 16A and 16B. This white fibrous material is exemplified further through the microscopy images from a Keyence 900F optical microscope as seen in FIGS. 17A through 17D. The fibrous material intertwines to create a network carboxylate-alumoxane, which is ideal for applications in self-healing, fiber reinforced composites, and anti-skid applications. From these images of the monocarboxylate-alumoxane, the molecular structure becomes intuitive. FIGS. 18A and 18B demonstrate the molecular structure within each of the microfibers. The nano-boehmite coated onto the surface of capsules is an aluminum oxide-hydroxide, which then reacts with the deprotonated carboxylic acid to form the wire-like structure shown. The monocarboxylate guides crystalline growth of the carboxylate-alumoxane, which happens quickest in one dimension with the single functional group shown here. The presence of both the boehmite and the carboxylate are confirmed in an FTIR spectra in FIG. 19 with a peak at 1067 $cm^{-1}$ to signal Al—O—Al, and a large peak at 3276 $cm^{-1}$ to confirm the carboxylate group.

Figure 20A:
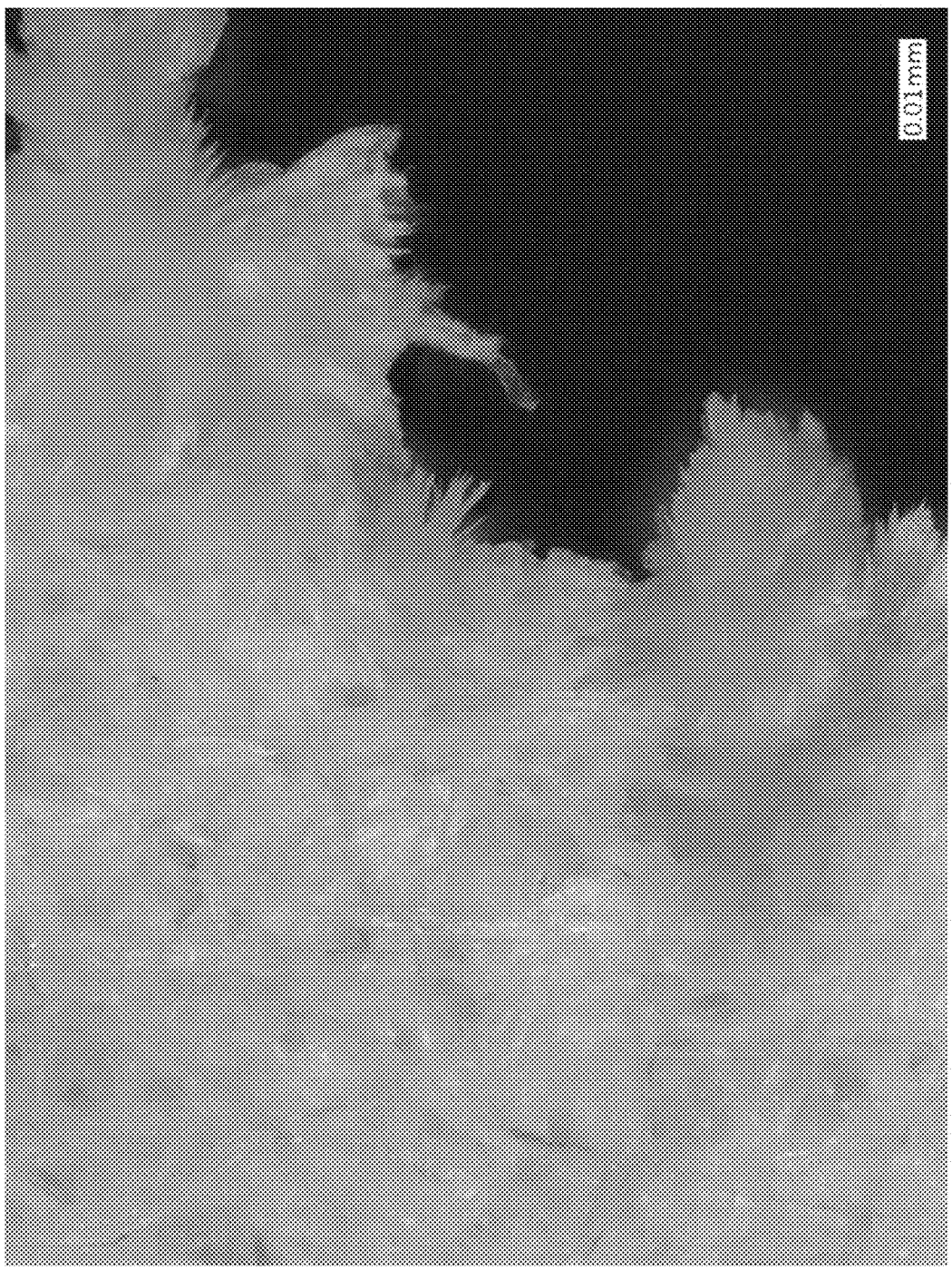
FIG. 20A is an optical microscope image of a crystalline, self-healing reaction product from a capsule having a tetradecanedioic acid in the core and nano-boehmite tethered to the a RUF polymer wall by a surfactant.
Figure 20B:
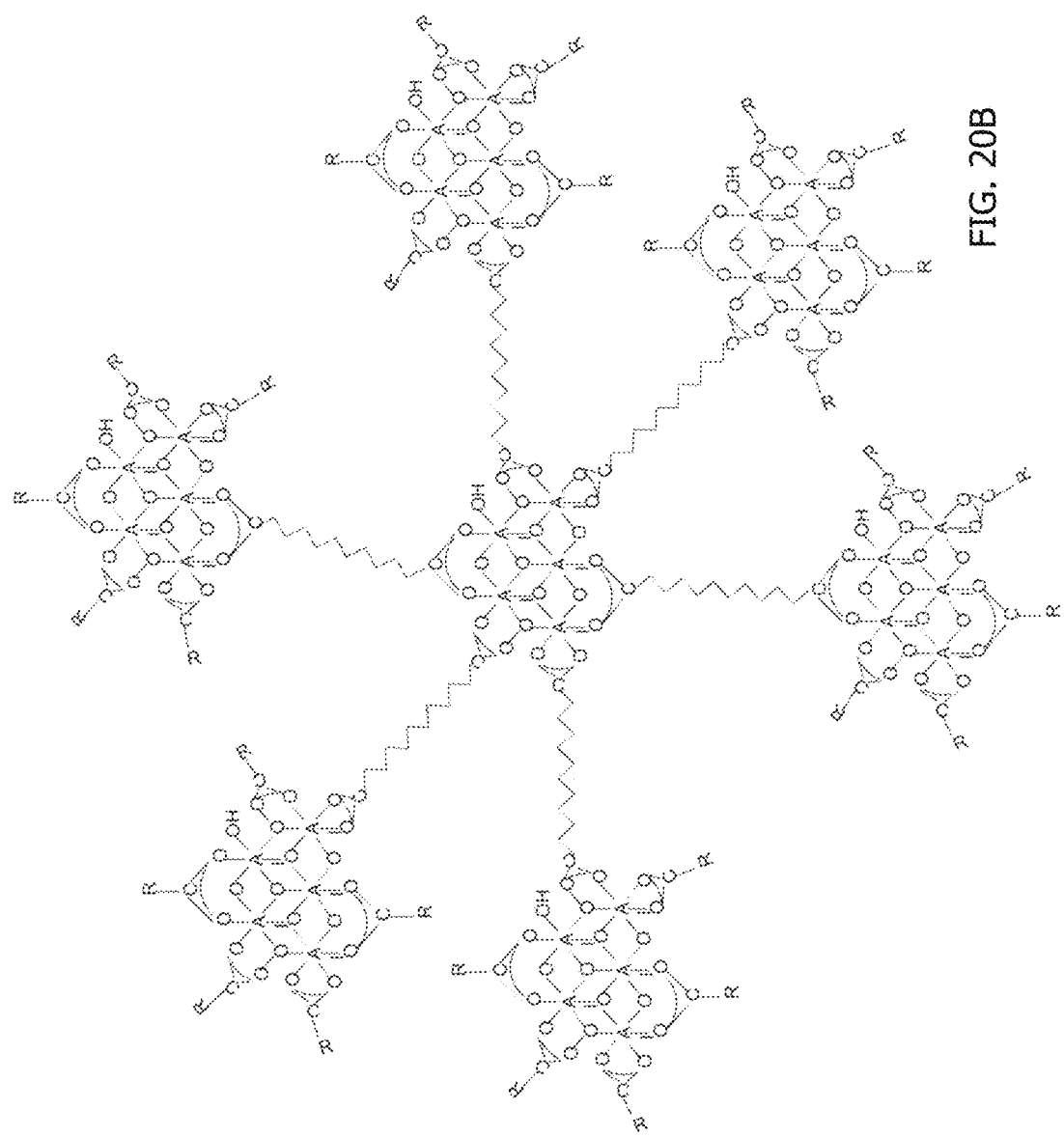
FIG. 20B is a representation of the molecular structure of the crystalline reaction product of FIG. 20A.
Figure 20C:
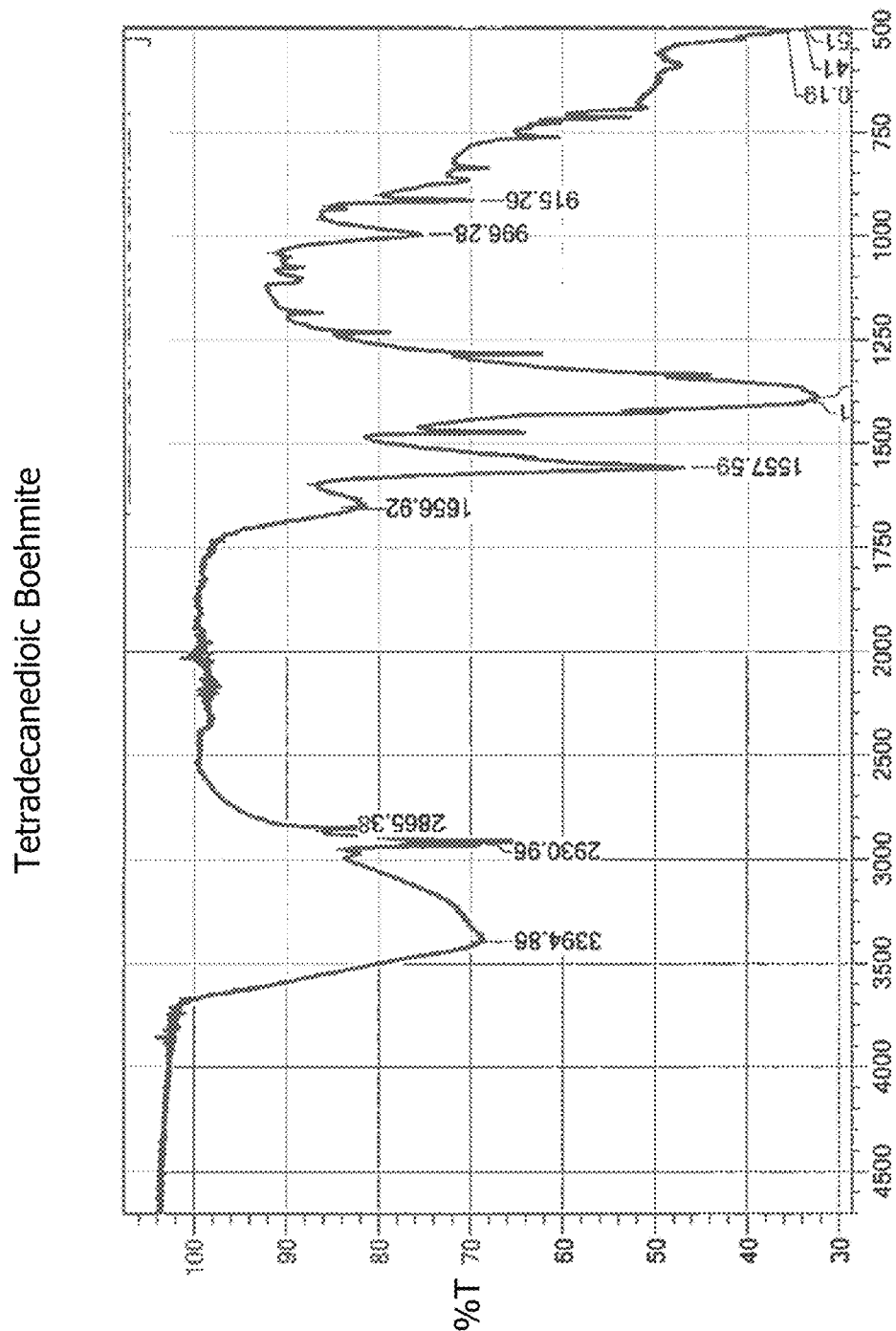
FIG. 20C is an FTIR spectrum of the crystalline reaction product in FIG. 20A.

Example 4 was repeated for a variety of monocarboxylic acids, dicarboxylic acids, and tricarboxylic acids, where the type of carboxylic acid used changed the structure of the reaction product with the nano-boehmite. FIG. 20A demonstrates through microscopy the resulting carboxylate-alumoxane that forms when tetradecanedioic acid (a dicarboxylic acid) reacts with nano-boehmite. From the microscope image, it can be seen that these fibers are shorter and sheet-like, forming a thick network, which is great for applications in self-healing, composites, and anti-skid applications. The molecular structure is shown in FIG. 20B, where it can be seen that the dual functionality resulting from two carboxylate groups results in a sheet-like structure. FIG. 20c further confirms the presence of both functional groups in FTIR.

Figure 21A:
FIG. 21A is an optical microscope image of a tricarboxylate-alumoxane from a capsule having citric acid in the core and nano-boehmite tethered to the RUF polymer wall by a surfactant.
Figure 21B:
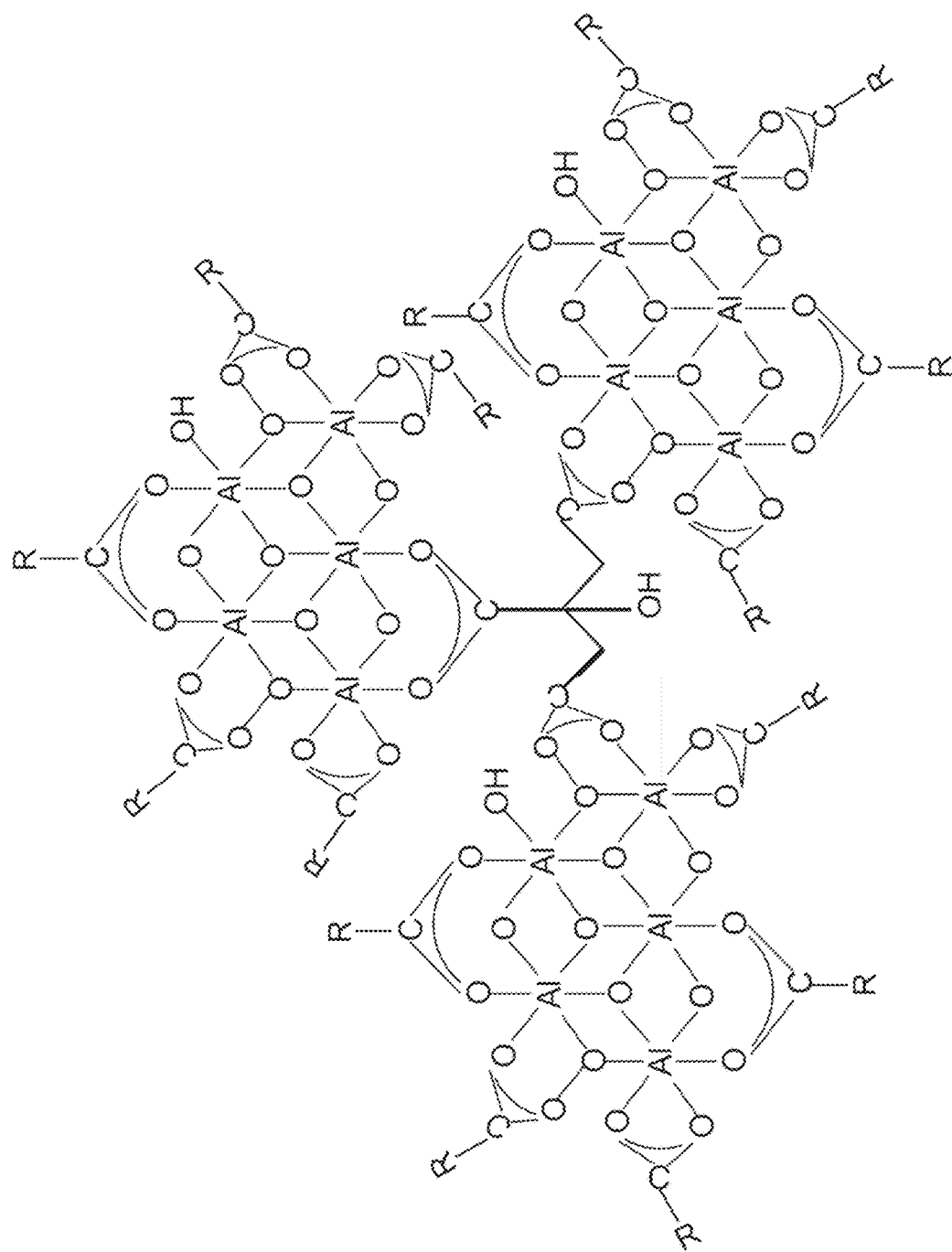
FIG. 21B is a representation of the molecular structure of the crystalline reaction product of FIG. 21A.
Figure 22A:
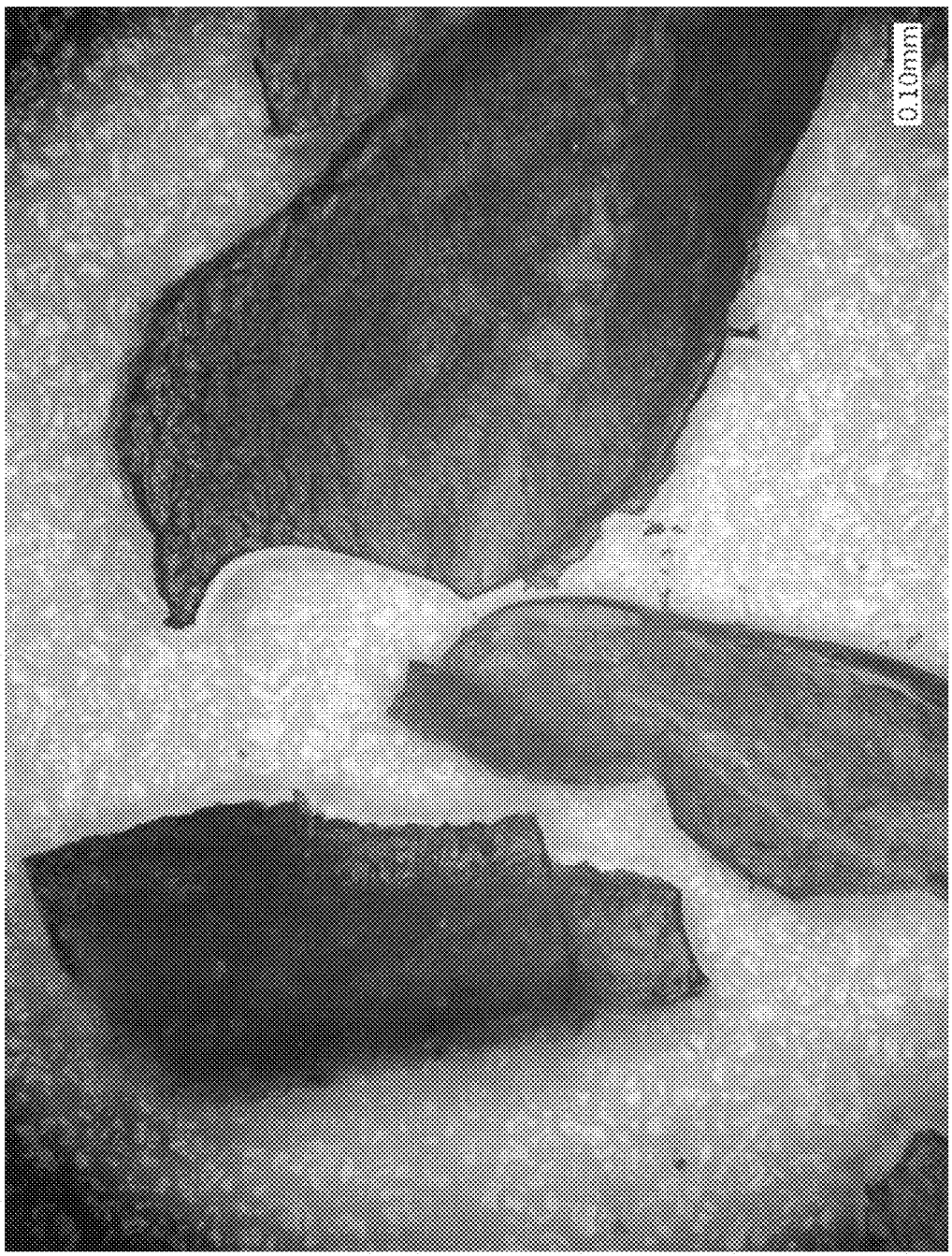
FIG. 22A is an optical microscope image of a sheet-like, self-healing reaction product from a capsule having a graphene oxide functionalized with carboxylic acids in the core and nano-boehmite tethered to the a RUF polymer wall by a surfactant.
Figure 22B:
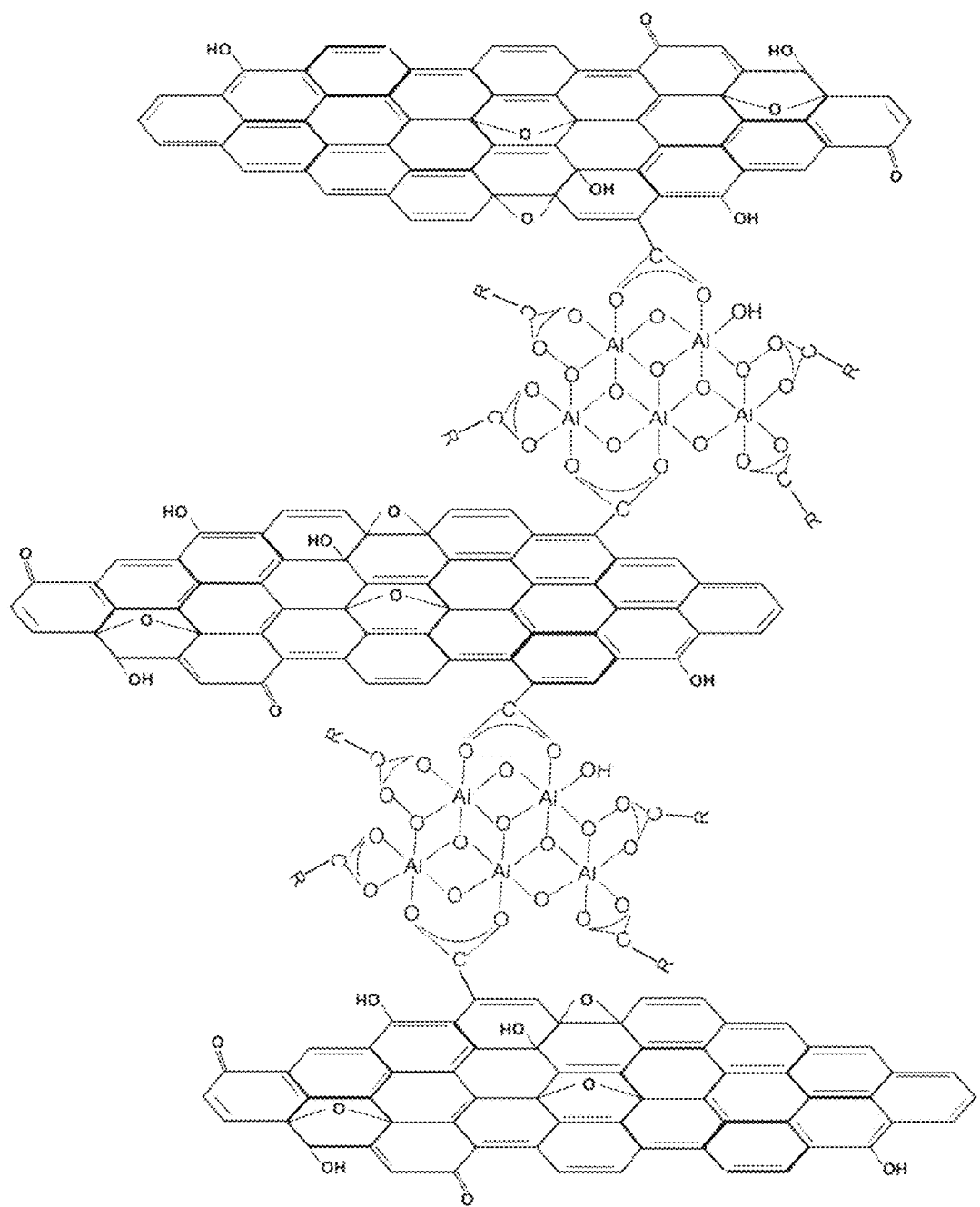
FIG. 22B is a representation of the molecular structure of the sheet-like reaction product of FIG. 22A.
Figure 22C:
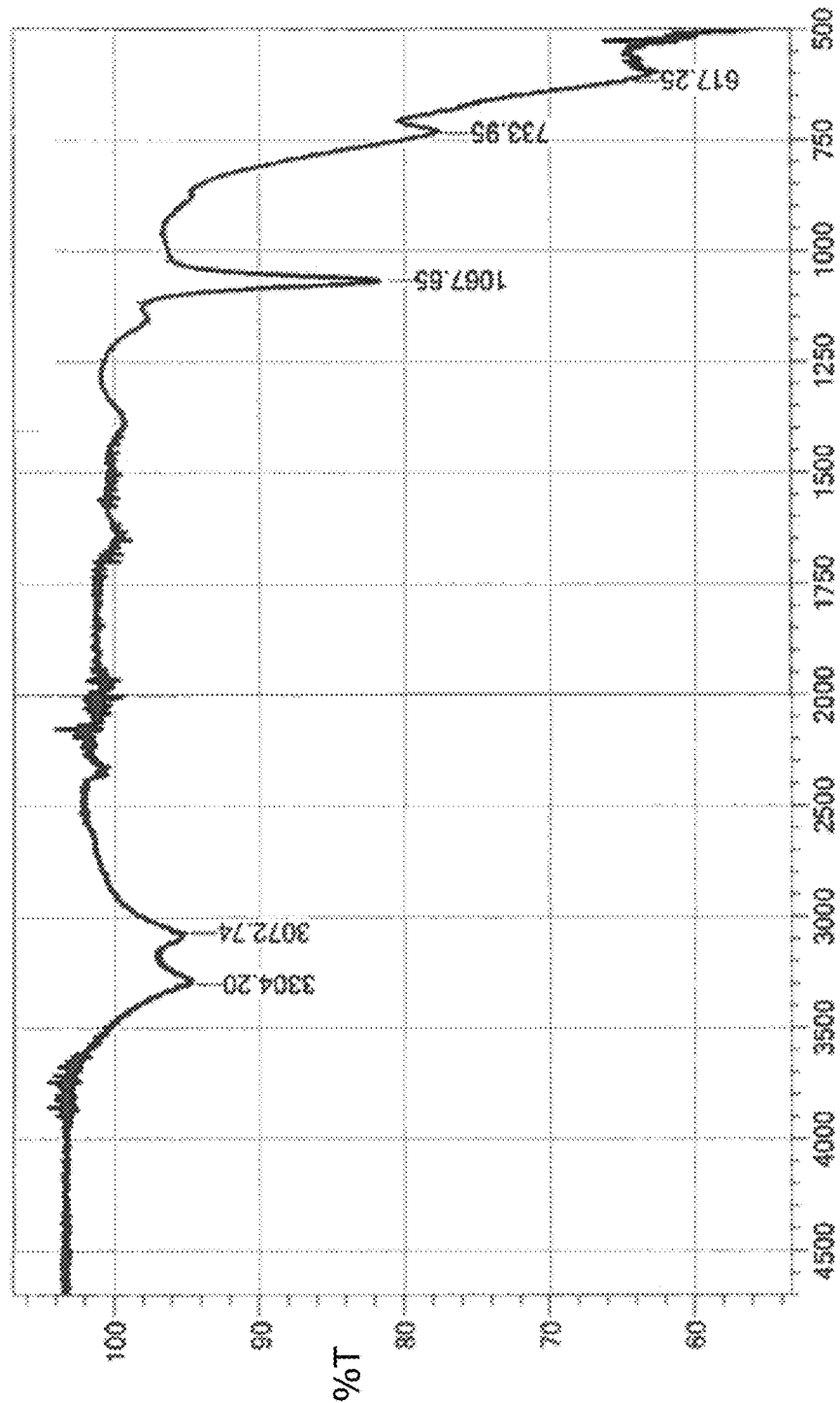
FIG. 22C is an FTIR graph of the crystalline reaction product in FIG. 22A.

A tricarboxylate-alumoxane resulted from a reaction between citric acid and nano-boehmite, which can be seen the microscopy image of FIG. 21A, which shows this tricarboxylate-alumoxane to be more of a cube-like structure. The cube-like structure is more easily visualized when looking at its molecular structure shown in FIG. 21B. Because of the three functional groups that are close together in proximity, the reaction product was tightly-packed and cube-like in shape. Sheet-like carboxylate containing graphene oxide-alumoxane crystals resulted from a reaction between graphene oxide functionalized with carboxylic acids and nano-boehmite. The microscopy image can be seen in FIG. 22A. In this image, distinct layers can be seen within the structures, which can be more easily visualized in FIG. 22B, and results in some interesting properties. The properties of this resultant material would be highly interesting to those in electronics, materials scientists, engineers, and the like. The FTIR spectrum shown in FIG. 22C confirms the presence of the aluminum compound as well as graphene.

Figure 23A:
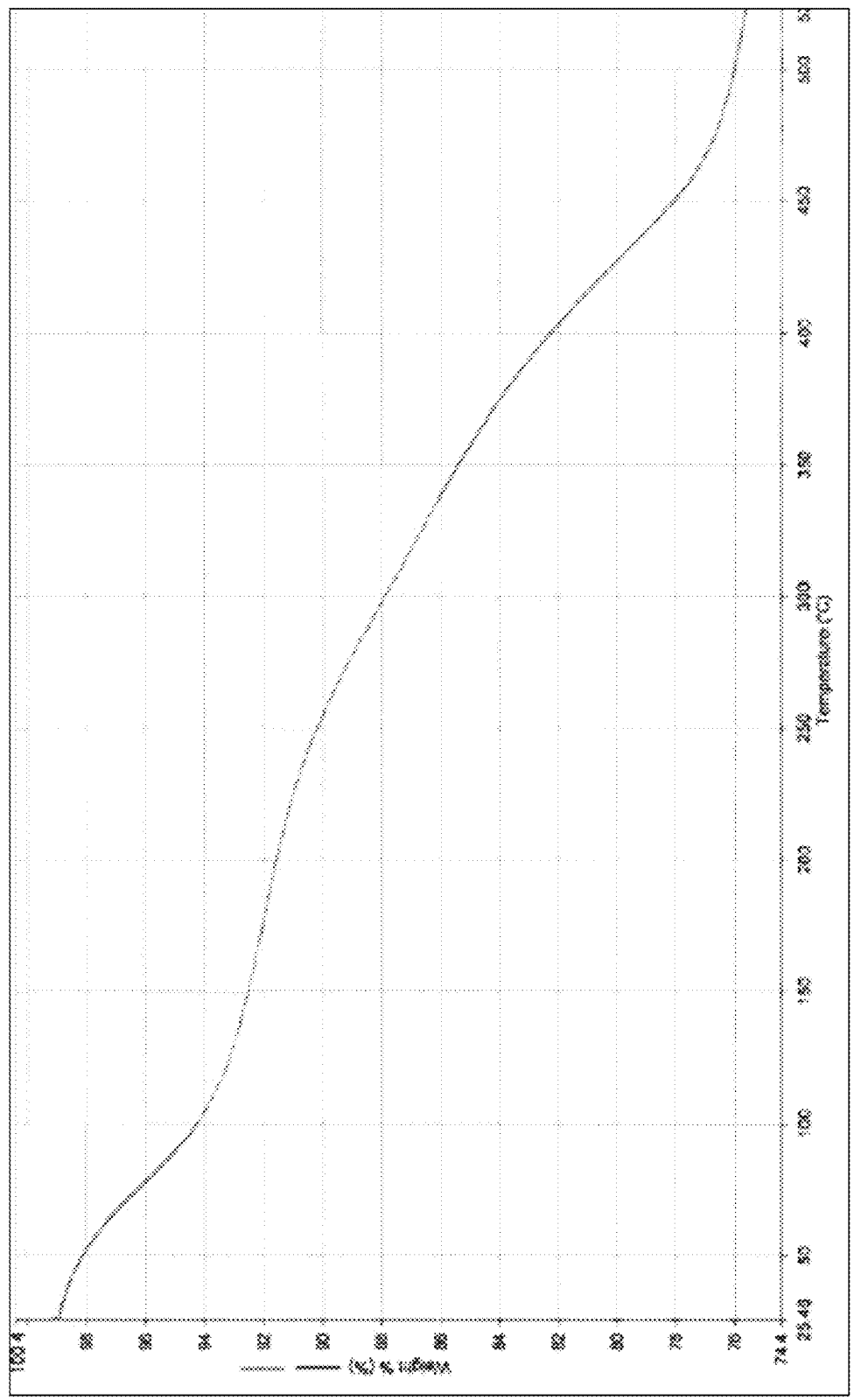
FIG. 23A is a thermogravimetric analysis (TGA) graph of graphene oxide-alumoxane.
Figure 23B:
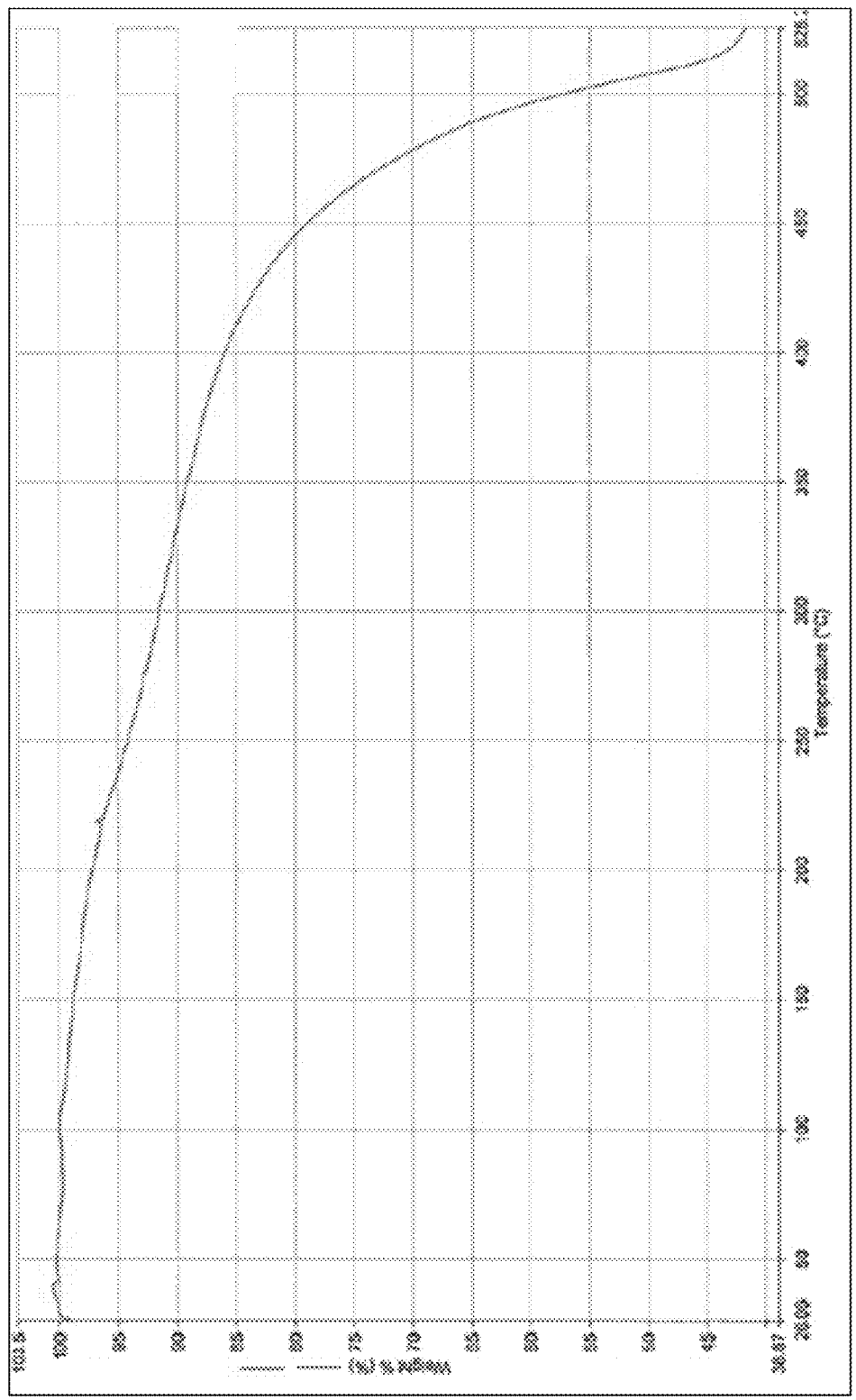
FIG. 23B is a TGA graph of octanoate-alumoxane.
Figure 23C:
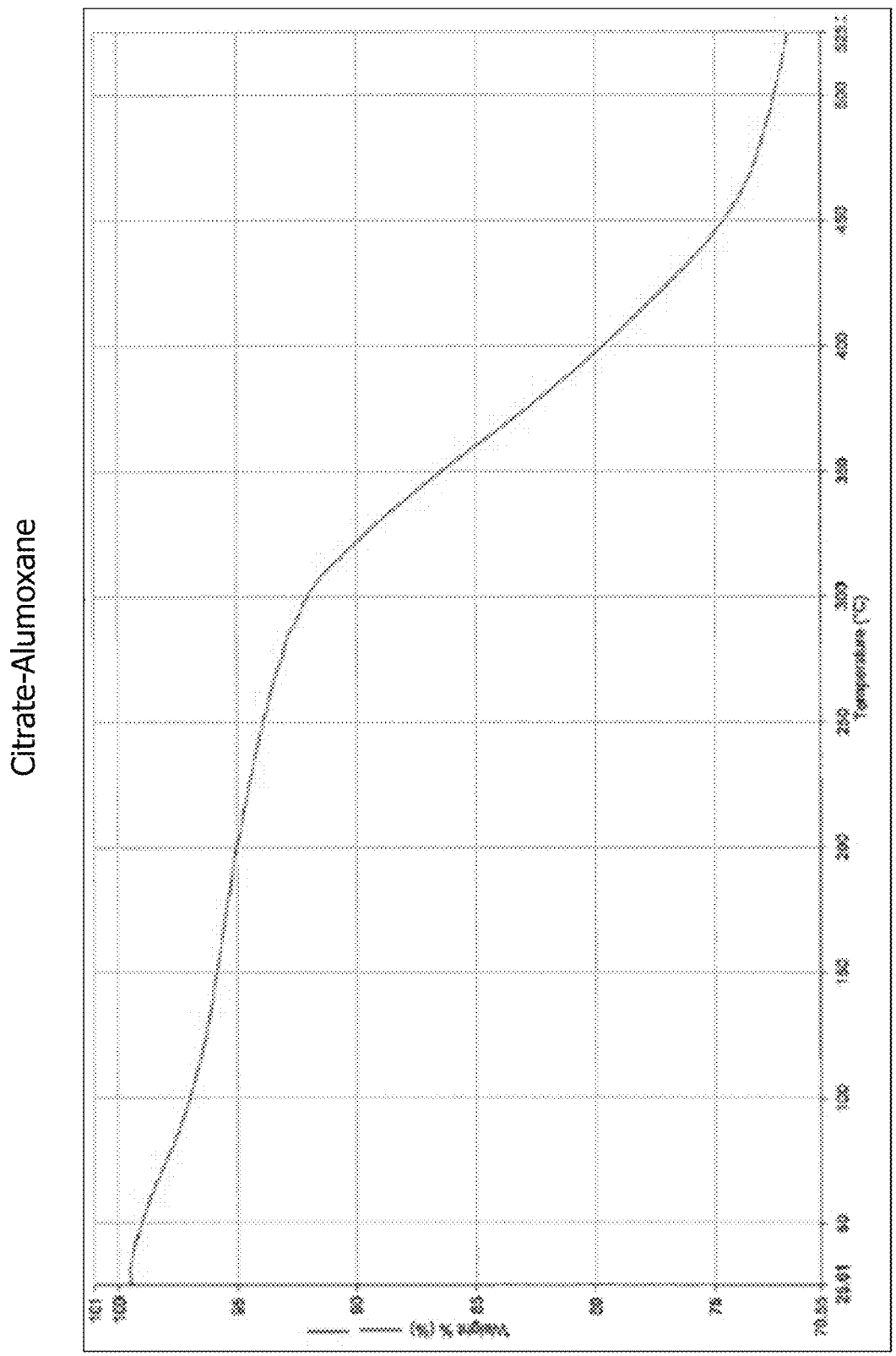
FIG. 23C is a TGA graph of citrate-alumoxane.
Figure 23D:
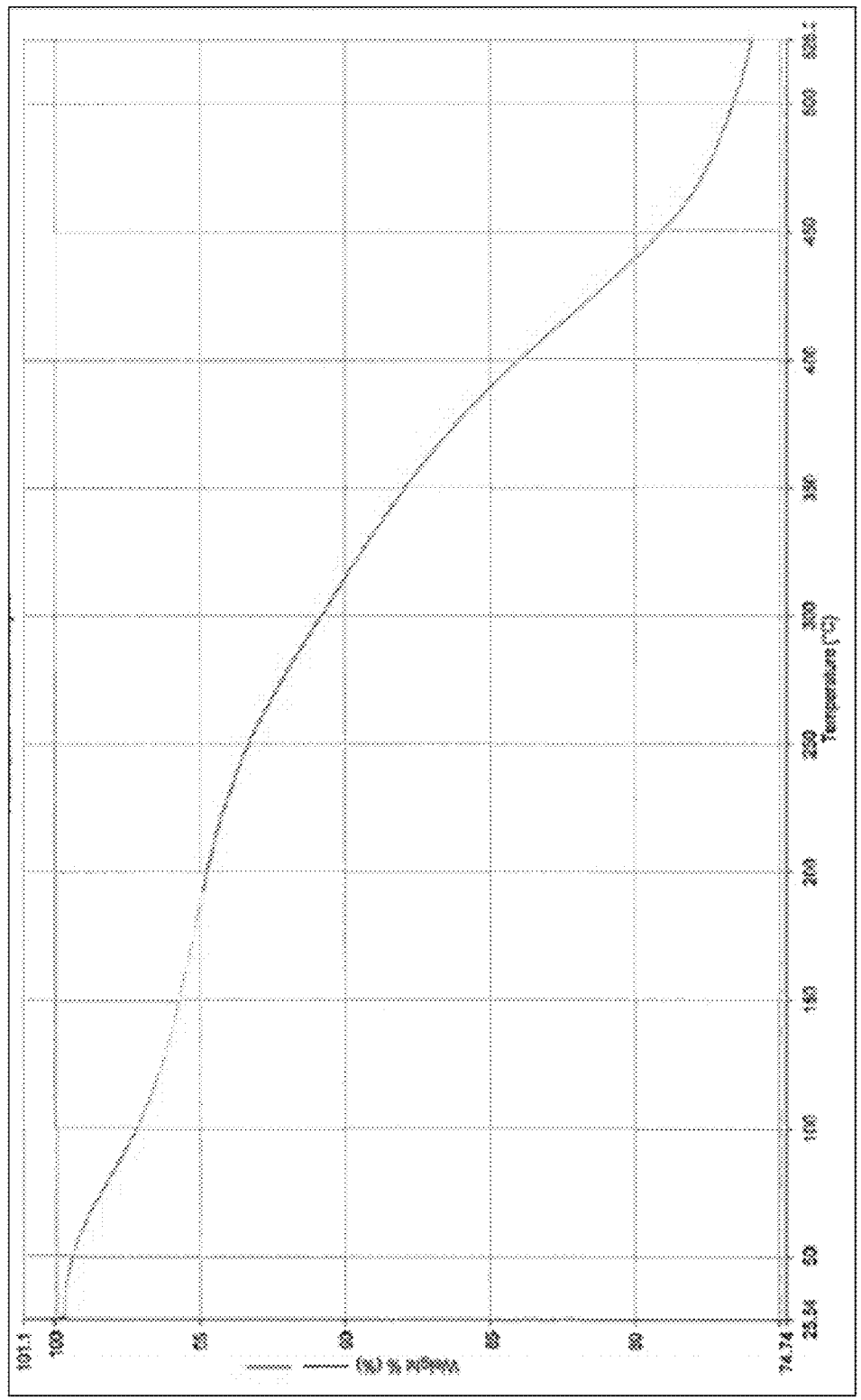
FIG. 23D is a TGA graph of tetradecanedioate-alumoxane.

Thermal properties of the four carboxylate-alumoxanes evaluated above were tested using thermogravimetric analysis (TGA). All four carboxylate-alumoxanes were found to be highly thermally stable until at least 400° C. as evidenced by the graphs of FIGS. 23A-23D. Referring to FIG. 23A, at 80 weight %, graphene oxide alumoxane had a temperature of 425° C. Referring to FIG. 23B, at 80 weight %, ocanoate-alumoxane had a temperature of 450° C. Referring to FIG. 23C, at 80 weight %, citrate-alumoxane had a temperature of 400° C. Referring to FIG. 23D, at 80 weight %, tetradecanedioate-alumoxane had a temperature of 447° C.

The advantage of the microcapsules described above is the accessibility between the first and second reagents. Since the second reagent is carried by the microcapsule, equality of dispersement in a coating is easily achieved, and as soon as the capsule is ruptured, the core reagent material, which is selected to be a liquid at the time of rupture, comes into contact with the reagent material tethered to the surface of the capsule. Accordingly, very precise reactions can be carried out within a small surface area coated with the microcapsules. These dual reagent mono-microcapsules have applications in areas such as self-healing materials, adhesives, security, textiles and dyes, and medical fields, but are not limited thereto. For example, a micro-crack that forms in a coating on a pipe can be healed by the reaction product of the two reagents upon rupture of the mono-microcapsules (the cause of the crack or the cracking process itself ruptures the mono-microcapsules), which forms before the crack is allowed to get any bigger and damage the pipe. This property of self-healing is attractive within the construction and marine industries, as repair of certain materials can be difficult, especially pipes or metal beams that are underwater.

The embodiments of this invention shown in the drawings and described above are exemplary of numerous embodiments that may be made within the scope of the appended claims. The scope of the patent issuing herefrom should be construed as limited only by the scope of the appended claims.

What is claimed is:

1. A dual reagent mono-capsule rupturable under alkaline conditions comprising:
a preformed capsule comprising a core composition encapsulated within a phenolic resin-containing polymer wall, the core composition comprising a carboxylic acid;
a surfactant connected to an exterior surface of the polymer wall; and
a mineral containing a metal attracted to the surfactant by a chemical electrostatic interaction;
wherein the phenolic resin-containing polymer wall ruptures upon exposure to alkaline conditions over a period of time and, upon rupture of the polymer wall, the carboxylic acid and the mineral containing the metal chemically react with one another to form a reaction product.

2. The capsule of claim 1, wherein the metal is selected from the group consisting of aluminum calcium, silver, magnesium, iron, copper, and cobalt, and combinations thereof.

3. The capsule of claim 2, wherein the metal is an aluminum.

4. The capsule of claim 1, wherein the mineral containing the metal is nano-boehmite.

5. The capsules of claim 1, wherein the mineral is in a crystalline state.

6. The capsule of claim 5, wherein the mineral containing the metal forms a discontinuous wall encapsulating the polymer wall.

7. The capsule of claim 1, wherein the surfactant comprises an ionic surfactant.

8. The capsule of claim 1, wherein the polymer wall comprises resorcinol urea formaldehyde, or resorcinol urea glutaraldehyde.

9. The capsule of claim 1, wherein the polymer wall has a colorimetric change upon exposure to the alkaline conditions.

10. The capsule of claim 1, wherein the rate of rupture of the polymer wall under alkaline conditions increases as the pH increases.

11. The capsule of claim 1, wherein the carboxylic acid is a carboxylic acid functionalized graphene oxide, a mono-carboxylic acid, a dicarboxylic acid, a tricarboxylic acid, or combinations thereof.

12. A method for surface treating capsules, the method comprising:
providing capsules comprising a core composition comprising a carboxylic acid encapsulated within a phenolic-resin containing polymer wall, wherein the phenolic resin-containing polymer wall ruptures upon exposure to alkaline conditions over a period of time;
mixing an aqueous surfactant and the capsules together, wherein the surfactant attaches to an exterior surface of the polymer wall to form a surfactant-capsule intermediate;
adding a solution of an inorganic compound wherein a metal therein is available for association with the surfactant;
mixing until the metal of the inorganic compound chemically bonds to the surfactant and forms an outer shell on the polymer wall of the capsules;
wherein, upon rupture of the capsules, the carboxylic acid and the outer shell chemically react with one another to form a reaction product.

13. The method of claim 12, further comprising forming the capsules before mixing with the aqueous surfactant.

14. The method of claim 12, wherein the outer shell is a discontinuous outer shell.

15. The method of claim 12, wherein the surfactant comprises an ionic surfactant.

16. The method of claim 12, wherein the polymer wall comprises resorcinol urea formaldehyde, or resorcinol urea glutaraldehyde.

17. The method of claim 12, wherein the carboxylic acid is a carboxylic acid functionalized graphene oxide, a monocarboxylic acid, a dicarboxylic acid, a tricarboxylic acid, or combinations thereof.

18. The method of claim 12, wherein the polymer wall has a colorimetric change upon exposure to the alkaline conditions.

\* \* \* \* \*